US010563556B2

(12) United States Patent
Armiento et al.

(10) Patent No.: US 10,563,556 B2
(45) Date of Patent: Feb. 18, 2020

(54) METHODS AND SYSTEMS FOR AN EXHAUST GAS TREATMENT ARRANGEMENT

(71) Applicant: Ford Global Technologies, LLC, Dearborn, MI (US)

(72) Inventors: Maria Armiento, Aachen (DE); Jan Harmsen, Simpelveld (NL); Mario Balenovic, Waalre (NL); Robert Ukropec, Herzogenrath (DE); Christian Nederlof, Voerendaal (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/262,786

(22) Filed: Jan. 30, 2019

(65) Prior Publication Data
US 2019/0242285 A1    Aug. 8, 2019

(30) Foreign Application Priority Data

Feb. 7, 2018   (DE) .................. 10 2018 201 868

(51) Int. Cl.
*F01N 3/22* (2006.01)
*F01N 11/00* (2006.01)
(Continued)

(52) U.S. Cl.
CPC ......... *F01N 3/225* (2013.01); *B01D 53/9431* (2013.01); *B01D 53/9495* (2013.01);
(Continued)

(58) Field of Classification Search
CPC ............... B01D 53/94; B01D 53/9409; B01D 53/9422; B01D 53/9477; B01D 53/9481; B01D 53/9495; B01D 2251/11; B01D 2257/402; B01D 2257/404; B01D 2258/01; B01D 2258/012; F01N 3/18; F01N 3/206;
(Continued)

(56) References Cited

U.S. PATENT DOCUMENTS 6,973,777 B2   12/2005   Bayerle et al.
8,621,847 B2   1/2014    Gonze et al.
(Continued)

FOREIGN PATENT DOCUMENTS

WO    WO 9624756 A1 *  8/1996    ........... F01N 3/0814

OTHER PUBLICATIONS

Wittka, T. et al., "Experimental Investigation of Combined LNT + SCR Diesel Exhaust Aftertreatment," Emission Control Science and Technology, vol. 1, No. 2, May 2015, Available Online Feb. 13, 2015, 33 pages.
(Continued)

*Primary Examiner* — Timothy C Vanoy
(74) *Attorney, Agent, or Firm* — Geoffrey Brumbaugh; McCoy Russell LLP

(57) ABSTRACT

Methods and systems are provided for an exhaust gas arrangement. In one example, a system includes a lean-$NO_x$ trap arranged upstream of a selective-catalytic reduction device with an air supply device positioned to inject air therebetween, wherein the air supply device is activated in response to an exhaust gas being rich and an exhaust gas temperature exceeding a limit temperature.

20 Claims, 10 Drawing Sheets

(51) Int. Cl.
*F01N 13/00* (2010.01)
*B01D 53/94* (2006.01)
*F01N 3/08* (2006.01)
*F01N 3/20* (2006.01)

(52) U.S. Cl.
CPC .......... *F01N 11/005* (2013.01); *F01N 11/007* (2013.01); *F01N 13/008* (2013.01); *F01N 3/0814* (2013.01); *F01N 3/0842* (2013.01); *F01N 3/0885* (2013.01); *F01N 3/2066* (2013.01); *F01N 2900/0601* (2013.01); *F01N 2900/1402* (2013.01); *F01N 2900/1404* (2013.01)

(58) Field of Classification Search
CPC .......... F01N 3/2066; F01N 3/208; F01N 3/22; F01N 3/225; F01N 3/30; F01N 9/00; F01N 2240/18; F01N 2250/12; F01N 2270/00; F01N 2570/14; F01N 2570/145; F01N 2610/085; F01N 2900/1404
See application file for complete search history.

(56) References Cited

U.S. PATENT DOCUMENTS

| | | | |
|---|---|---|---|
| 9,163,543 | B2 | 10/2015 | Cavataio et al. |
| 9,376,949 | B2 | 6/2016 | Gandhi et al. |
| 2004/0083716 | A1 | 5/2004 | Twigg |
| 2010/0236224 | A1* | 9/2010 | Kumar ............... B01D 53/9477 60/297 |
| 2016/0169135 | A1* | 6/2016 | von der Ehe ....... F02D 41/0027 60/274 |
| 2017/0167337 | A1* | 6/2017 | Choung ................ F01N 3/0871 |
| 2017/0175655 | A1 | 6/2017 | RempelEwert et al. |
| 2017/0284266 | A1* | 10/2017 | Roy ...................... F01N 13/009 |

OTHER PUBLICATIONS

Kang, W. et al., Abstract of "PM and NOx Reduction Characteristics of LNT/DPF+SCR/DPF Hybrid System," Energy, vol. 143, Jan. 15, 2018, Available Online Nov. 2017, 3 pages.

* cited by examiner

METHODS AND SYSTEMS FOR AN EXHAUST GAS TREATMENT ARRANGEMENT

CROSS REFERENCE TO RELATED APPLICATION

The present application claims priority to German Patent Application No. 102018201868.5, filed Feb. 7, 2018. The entire contents of the above-listed application are hereby incorporated by reference in their entirety for all purposes.

FIELD

The present description relates generally to adjusting operating parameters for a selective catalytic reduction (SCR) device.

BACKGROUND/SUMMARY

Reduction of $NO_x$ is of increasing concern as emission guidelines become more stringent. Types of emission treatments may include nitrogen oxide storage catalysts, also known as NSR catalysts, (e.g., $NO_x$ storage and reduction catalyst) or a lean $NO_x$ trap (LNT) may represent two exemplary aftertreatment devices for the catalytic conversion of nitrogen oxides. An alternative technology may include a selective catalytic reduction (SCR) device, which may utilize a reductant solution applied thereon to reduce nitrogen oxides.

LNT catalysts may store nitrogen oxides at temperatures below a threshold, wherein the nitrogen oxides stored thereon may be reduced in the presence of a rich air/fuel mixture. The hydrocarbons and carbon monoxide may function as reducing agents. Contrastingly, the SCR device may increase reduction efficiency at temperatures above the threshold, resulting in the SCR and LNT working in tandem to treat nitrogen oxide emission at a greater range of exhaust gas temperatures.

Thus, to meet the more stringent emission guidelines, it may be desired to pair the LNT catalyst and the SCR device in an exhaust gas treatment arrangement to increase a temperature range in which the nitrogen oxides may be reduced. However, this may lead to problems. In one example, the rich mixture used to reduce nitrogen oxides captured by the LNT catalyst may leak through the LNT, wherein the rich exhaust gas mixture may reach the SCR device, which may decrease the longevity of the SCR device.

One example approach to address rich exhaust gas flow to the SCR device is shown by Choung in U.S. 2017/0167337. Therein, an air supply device is arranged upstream of the SCR catalyst. If a combustion mixture is rich (e.g., lambda less than 1), air is supplied to the exhaust gas flow via the air supply device to increase the air/fuel ratio to greater than 1.

However, the inventors herein have recognized potential issues with such systems. As one example, the supply of air may decrease exhaust gas temperatures, which may decrease an efficiency of the SCR device and decrease nitrogen oxides reduced. Additionally, the air may oxidize a reductant agent arranged on the SCR device or being injected thereto, thereby increasing reductant agent consumption.

In one example, the issues described above may be addressed by a system for a lean-$NO_x$-trap arranged upstream of a selective-catalytic-reduction catalyst in an exhaust passage. An air supply device is arranged between the lean-$NO_x$-trap and the selective-catalytic-reduction catalyst. The system further comprises a controller with computer-readable instructions stored thereon that when executed enables the controller to adjust an air flow from the air supply device when an exhaust gas is rich and an exhaust gas temperature is greater than a threshold. In this way, air from the air supply device only flows when the exhaust gas temperature is greater than the threshold.

As one example, by allowing rich exhaust gas to flow to the SCR when its temperature is less than the threshold, the SCR may continue to treat nitrogen oxides during the current engine operating parameter or a later engine operating parameter. Furthermore, reductant stored on the SCR or being delivered to the SCR may be preserved, decreasing reductant consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
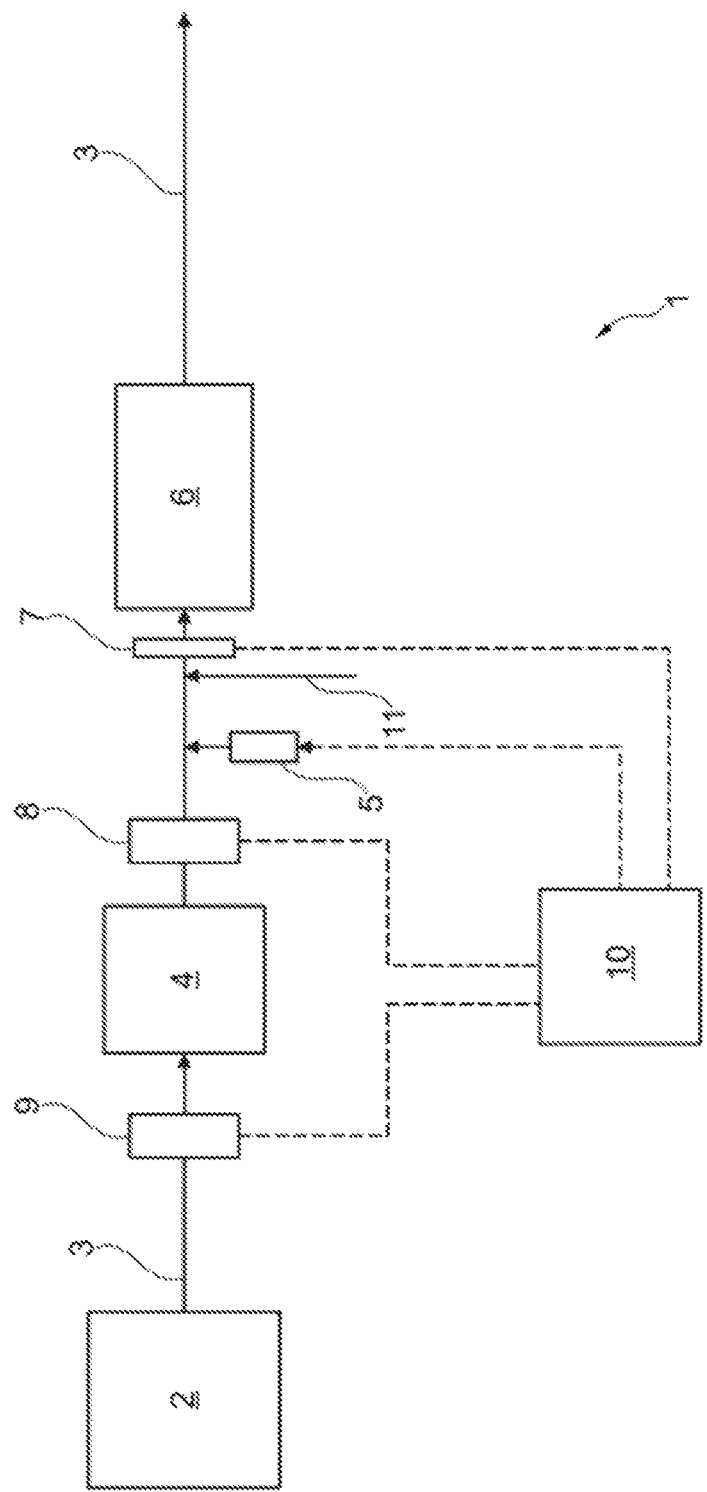
FIG. 1 illustrates a schematic of an exemplary exhaust gas arrangement with an internal combustion engine.
Figure 7:
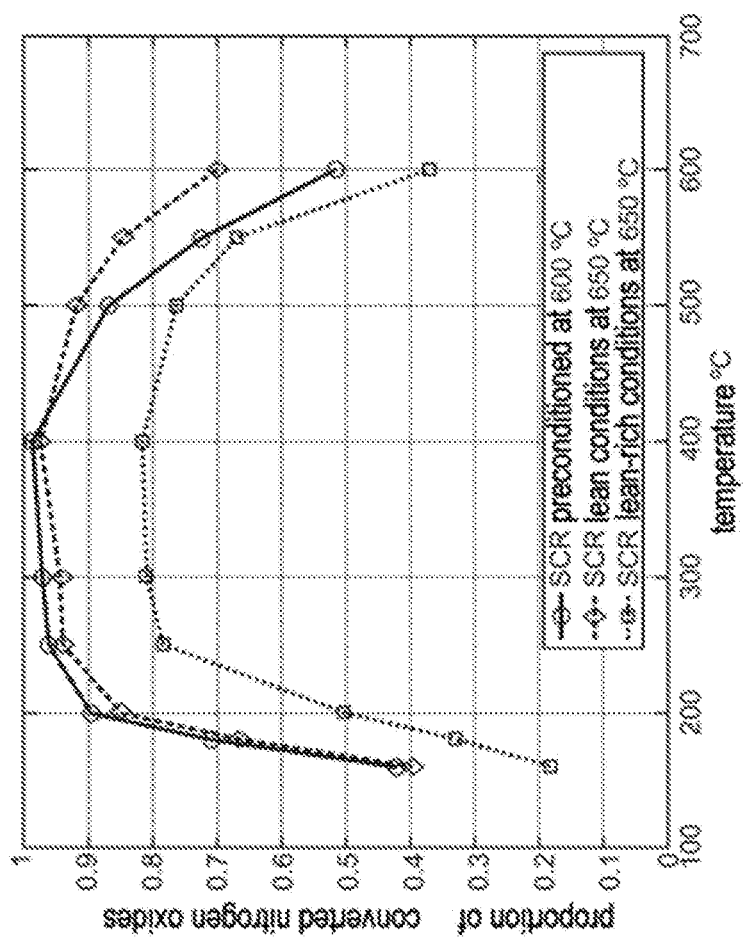
FIG. 7 illustrates the dependence of converted nitrogen oxide content on temperature of different SCR catalysts.
Figure 8:
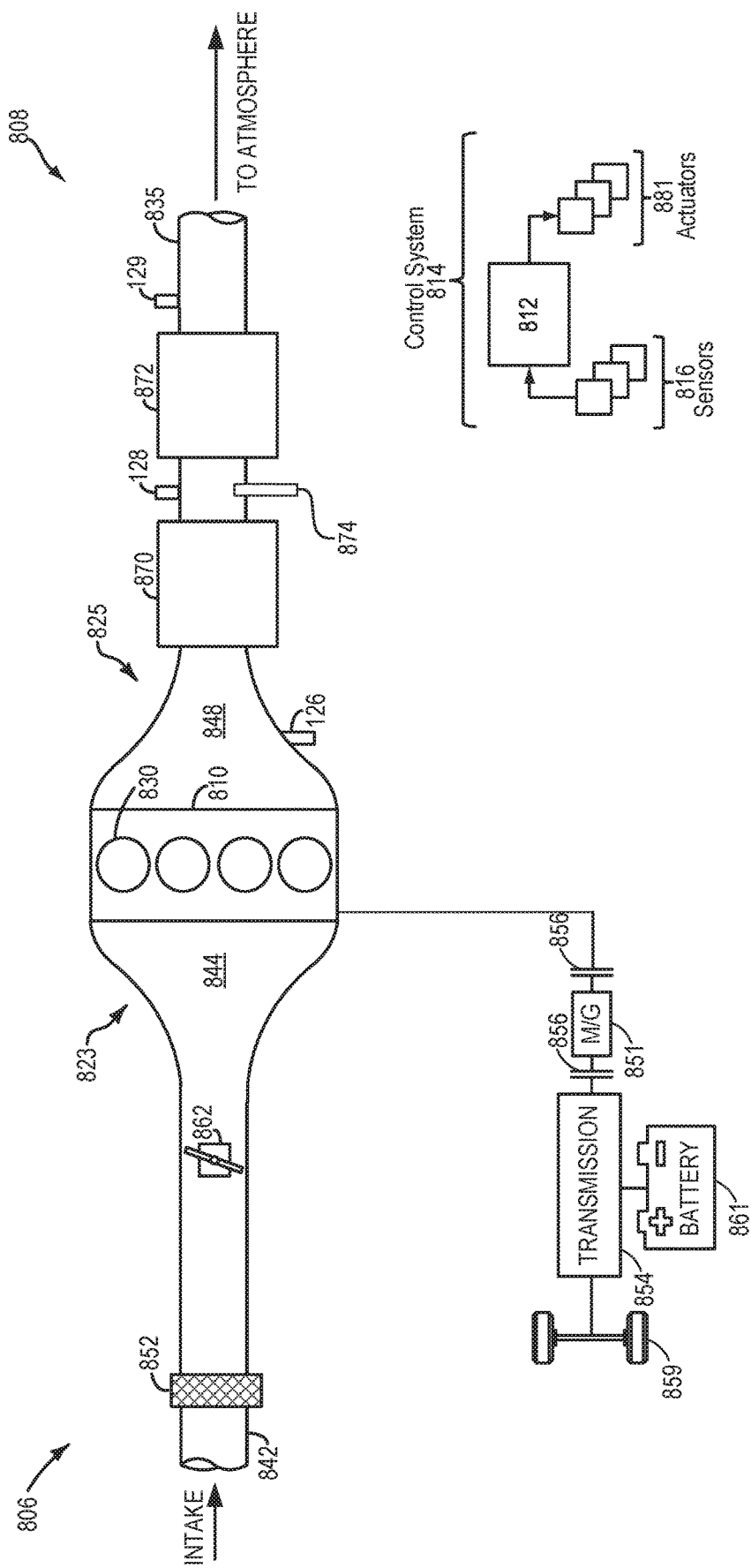
FIG. 8 illustrates a schematic of an engine included in a hybrid vehicle.
Figure 9:
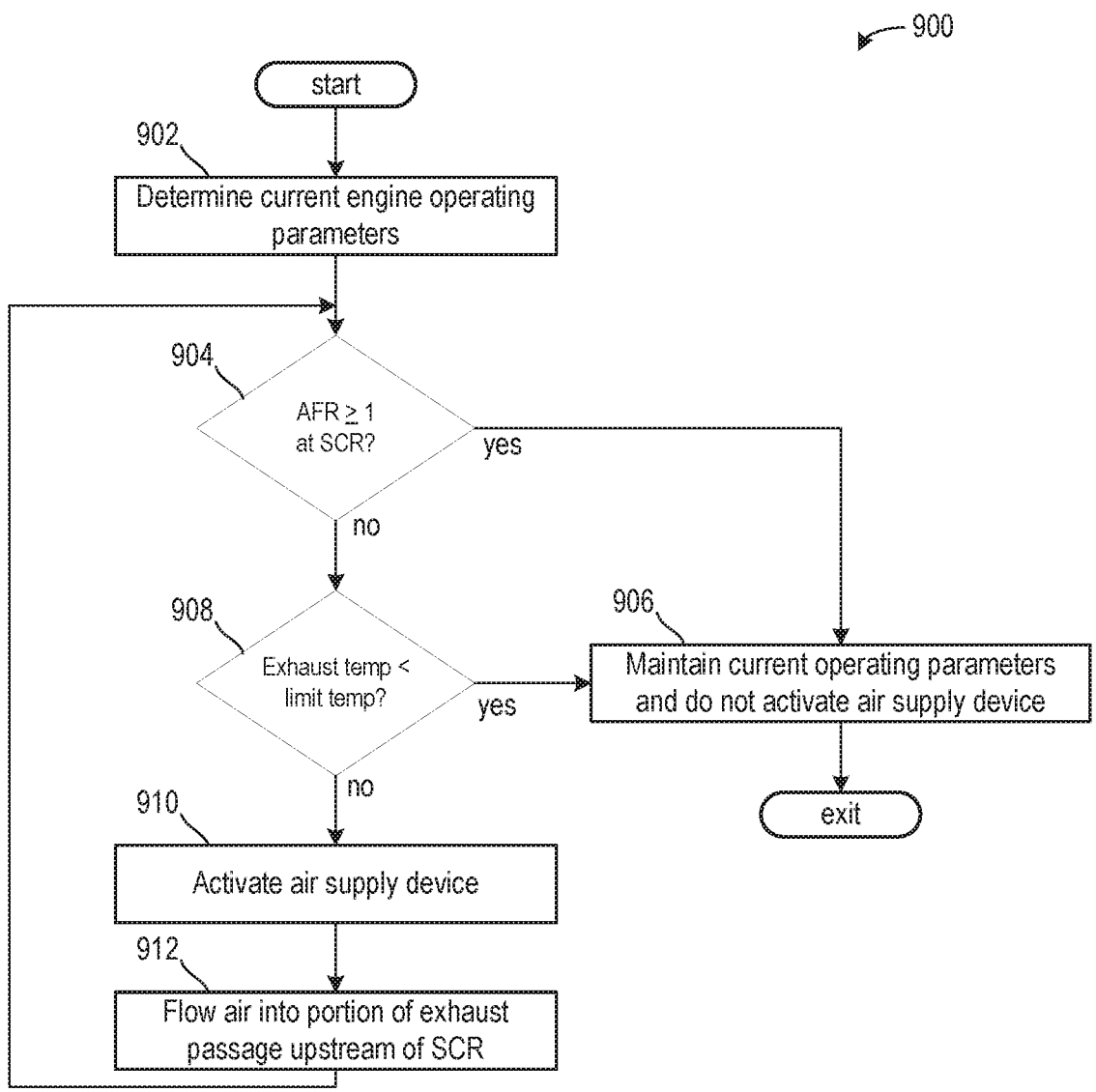
FIG. 9 illustrates a method for selectively introducing air into a junction between a LNT and a SCR catalyst.
Figure 10:
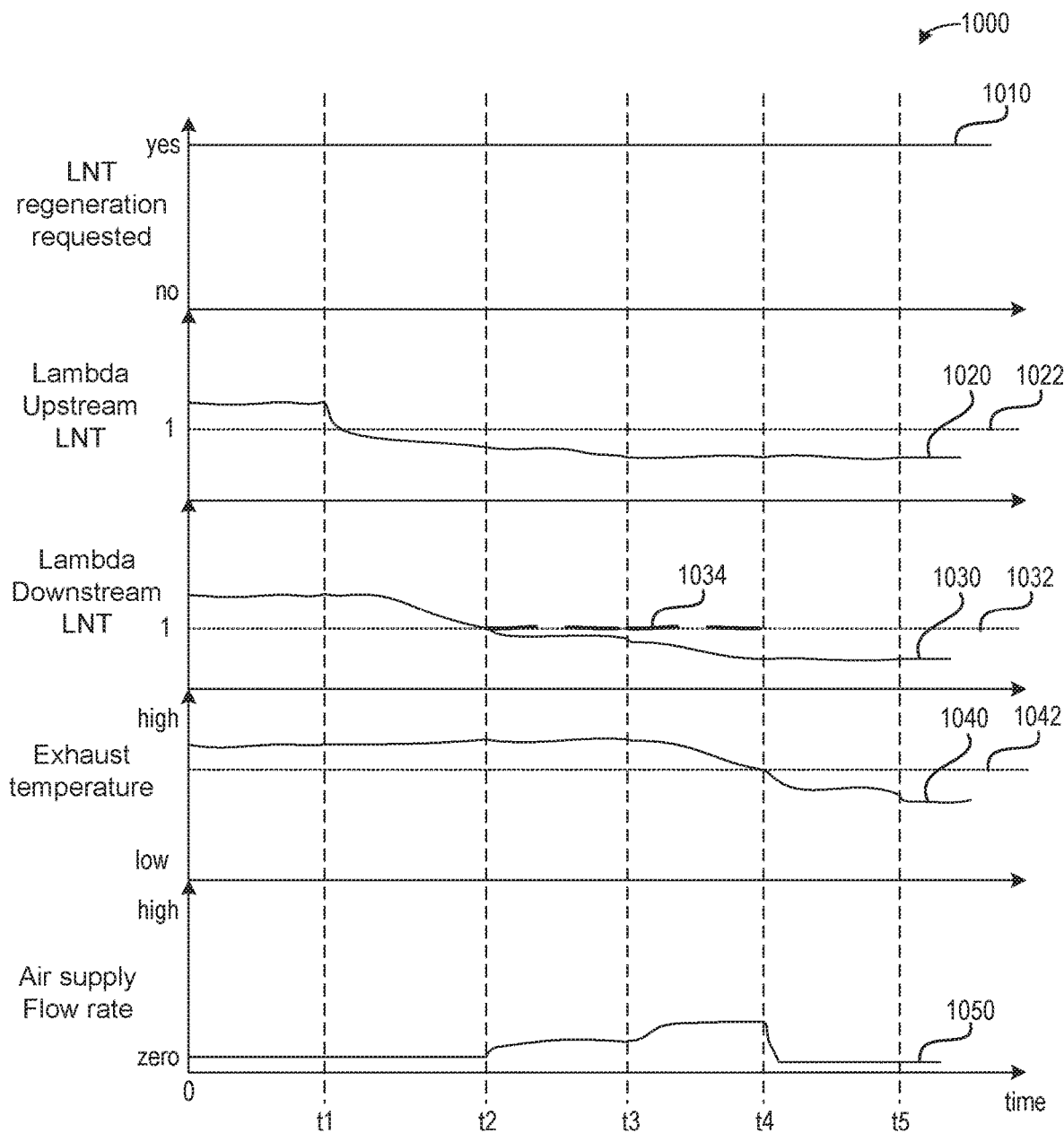
FIG. 10 illustrates an engine operating sequence illustrating adjustments to a variety of engine operating parameters as a LNT regeneration is executed.

The following description relates to systems and methods for an exhaust gas aftertreatment arrangement. The exhaust gas aftertreatment arrangement may comprise a lean $NO_x$ trap (LNT) upstream of a selective catalytic reduction (SCR) catalyst relative to a direction of exhaust gas flow, as shown in FIG. 1. An air supply device arranged in a portion of an exhaust passage between the LNT and the SCR catalyst may be activated in response to an exhaust gas being rich and the exhaust gas temperature being higher than a limit temperature. In one example, the air supply device is only activated in response to the exhaust gas being rich and its temperature higher than the limit temperature. Methods for activating the air supply device in response to feedback from various sensors and/or estimation of conditions at the SCR catalyst are shown in FIGS. 3-6. FIG. 7 illustrates a SCR catalyst $NO_x$ conversion efficiency at various temperatures. FIG. 8 shows a hybrid vehicle schematic. FIG. 9 shows an alternative method for operating the air supply device. FIG. 10 illustrates an engine operating sequence illustrating various plots being adjusted in response to other conditions.

The present disclosure is based on the recognition by the inventors that contact between a rich exhaust gas mix and the SCR catalyst has a detrimental effect on the performance of the SCR catalyst, in particular at high temperatures such as those prevailing during desulfurization (DeSOx), for example. This impairment of the performance of the SCR catalyst may be permanent and is due to the deactivation of the catalyst material, which may be a result of a sintering processes and/or the reduction of copper in the SCR catalyst.

Such an impairment of the performance of the SCR catalyst is moreover difficult to predict and can therefore only be accounted for inadequately when predicting the optimum quantity of reduction agent, (e.g. urea solution), to be supplied externally. If the performance of the SCR catalyst is reduced owing to contact with a hot, rich exhaust gas mix, but the same quantity of urea solution is still supplied, this results in an undesired release of ammonia and/or a lower conversion rate of the nitrogen oxides. Said another way, as the SCR catalyst degrades due to exposure to hot, rich exhaust gas, the SCR catalyst may be configured to store less reductant (e.g., ammonia). As such, an amount of urea injected into an exhaust gas may be based on an estimated catalytic activity of the SCR catalyst which may not include SCR catalyst degradation. As such, ammonia slip from the SCR catalyst may occur and $NO_x$ reduction may decrease.

Thus, the present disclosure is directed to protecting the SCR catalyst from a rich exhaust gas mix at high temperatures by supplying air to the exhaust gas flow upstream of the SCR catalyst via an air supply device in rich conditions and when the temperature of the exhaust gas flow exceeds a limit temperature. Owing to the oxygen contained in the air, rich, (e.g., reductively acting), constituents contained in the exhaust gas flow can be oxidized. The combustion air ratio $\lambda$ is thus increased. It is thus achieved that a rich exhaust gas mix does not arrive in the SCR catalyst and irreversible degradation to the SCR catalyst can be blocked.

LNT and SCR catalysts can therefore be used together for catalytic treatment of the exhaust gas flow. This enables effective catalytic treatment of the exhaust gas flow within a wide temperature range so that nitrogen oxides contained in the exhaust gas flow can be substantially removed and, at the same time, the SCR catalyst can be protected from degradation and an associated decline in its catalytic activity.

An exhaust gas system according to the disclosure for receiving an exhaust gas flow generated by an internal combustion engine comprises an LNT catalyst, an air supply device arranged downstream of the LNT catalyst, an SCR or SCR on filter catalyst arranged downstream of the air supply device, a temperature sensor for determining the temperature of the exhaust gas flow, and a lambda sensor. The lambda sensor may be arranged either upstream of the LNT catalyst or downstream of the LNT catalyst and upstream of the SCR catalyst, for example upstream of the air supply device or downstream of the air supply device.

If the lambda sensor is not already arranged downstream of the air supply device and upstream of the SCR catalyst, a further lambda sensor can be optionally arranged in this position so that the combustion air ratio of the exhaust gas flow supplied to the SCR catalyst can be determined and checked directly.

An alternative exhaust gas system for receiving an exhaust gas flow generated by an internal combustion engine comprises an LNT catalyst, an air supply device arranged downstream of the LNT catalyst, an SCR catalyst arranged downstream of the air supply device, a temperature sensor for determining the temperature of the exhaust gas flow upstream of the SCR catalyst, and a control and/or regulating unit, which is designed and constructed to output a control signal to the air supply device depending on sensor signals of the temperature sensor and depending on an operating mode of the internal combustion engine.

An internal combustion engine, sometimes also known as a combustion motor, refers to a combustion engine for converting chemical energy contained in the fuel into mechanical work. The internal combustion engine can be constructed for example as a self-igniting or spark-ignited internal combustion engine. Gasoline or diesel can be used as the fuel, for example. Indicated flow directions relate to the flow direction of the exhaust gas flow from the internal combustion engine in the direction of the exhaust.

Possible operating modes of an internal combustion engine are a rich operating mode, in which a rich air/fuel mix is supplied to the internal combustion engine, a lean operating mode, in which a lean air/fuel mix is supplied to the internal combustion engine, and a stoichiometric operating mode, in which a stoichiometric air/fuel mix is supplied to the internal combustion engine.

The exhaust gas system is formed by an exhaust gas line, through which the exhaust gas flows and in which the catalysts and sensors are arranged so that the exhaust gas flow can likewise flow through the catalysts and the properties of the exhaust gas flow (e.g. its composition, temperature, etc.) can be determined via the sensors.

The exhaust gas system comprises an air supply device. This serves for supplying air to the exhaust gas flow upstream of the SCR catalyst. The combustion air ratio $\lambda$ can be controlled or regulated by controlling or regulating the quantity of supplied air. The temperature of the exhaust gas flow can moreover be reduced by the air supply.

For example, the air supply device can be controlled depending on sensor signals, (e.g. the lambda sensor described below), and the temperature sensor so that the combustion air ratio $\lambda$ of the exhaust gas flow reaching the SCR catalyst can be increased by supplying air.

A temperature reduction can be particularly advantageous if the temperature upstream of the SCR catalyst is above an optimum temperature, (e.g. an optimum temperature of 300° C.). A high conversion rate for the nitrogen oxides and a durability of the SCR catalyst can thus be promoted. The effect of the temperature reduction can be taken into account when controlling or regulating the quantity of air supplied.

The temperature sensor for determining the temperature of the exhaust gas flow is arranged upstream of the SCR catalyst. For example, the temperature sensor can determine the temperature of the exhaust gas flow directly after it exits the internal combustion engine. To this end, the temperature sensor can be arranged upstream of the LNT catalyst.

So that the temperature of the exhaust gas flow reaching the SCR catalyst can be determined as accurately as possible, the temperature sensor can be arranged downstream of the air supply device between the air supply device and the SCR catalyst. A change in the temperature of the exhaust gas flow due to the air supply can thus advantageously also be taken into account. The temperature sensor can furthermore preferably be arranged immediately upstream of the SCR catalyst. Adequate mixing of the exhaust gas flow with the supplied air can thus be achieved before the temperature is determined.

A limit temperature (e.g., the optimum temperature) can be specified such that it differs depending on the position of the temperature sensor in the exhaust gas system. For example, a higher limit temperature can be specified for a temperature sensor arranged upstream of the LNT catalyst than for a temperature sensor arranged downstream of the LNT catalyst since, in this case, a cooling of the exhaust gas flow before it reaches the SCR catalyst should be taken into account. Said another way, the limit temperature is correlated to the optimum temperature of the SCR catalyst for treating nitrogen oxides, wherein the limit temperature is increased as the temperature sensor is moved upstream, further away from the SCR catalyst due to the exhaust gas cooling as it flows toward the SCR catalyst.

It is determined via the temperature sensor whether the temperature of the exhaust gas flow exceeds the limit temperature. The limit temperature can be in the region of 500° C., for example. It is provided to activate the air supply device, or to leave it in an activated state, only when the limit temperature is exceeded since it is only then that degradation to the SCR catalyst can occur in the event of contact with a rich exhaust gas mix. That is to say, even if rich exhaust gas is flowing, if the temperature of the exhaust gas does not exceed the limit temperature, then degradation to the SCR catalyst may not occur and the air supply device may not be activated so that air does not flow to the exhaust line.

According to the disclosure, in an alternative arrangement, a lambda sensor is arranged upstream of the LNT catalyst or downstream of the LNT catalyst and upstream of the air supply device and therefore also upstream of the SCR catalyst.

A lambda sensor refers to a sensor which supplies measurement signals from which the combustion air ratio $\lambda$, (e.g., the ratio of the air mass which is actually available for combustion to the necessary minimum stoichiometric air mass which is needed for complete combustion), is determined. The lambda sensor can be constructed for example as a lambda probe, which compares the residual oxygen content in the exhaust gas to the oxygen content of the atmospheric air at the time, from which the combustion air ratio can be determined. The lambda sensor can also be constructed as a nitrogen oxide sensor, since such nitrogen oxide sensors can also output the combustion air ratio in addition to determining the nitrogen oxide content.

The combustion air ratio upstream or downstream of the LNT catalyst can therefore be determined via the lambda sensor.

If the lambda sensor is arranged downstream of the LNT catalyst, it can be determined whether the exhaust gas is a rich exhaust gas mix ($\lambda<1$), a stoichiometric exhaust gas mix ($\lambda=1$) or a lean exhaust gas mix ($\lambda>1$) after it has flowed through the LNT catalyst. If a rich exhaust gas mix is supplied to the LNT catalyst for regeneration, the time at which regeneration of the LNT catalyst can be assumed can be determined via the lambda sensor, since a rich exhaust gas mix can also be detected downstream at this time. This time is also referred to as a lambda breakthrough.

If the lambda sensor detects a combustion air ratio $\lambda<1$ and the temperature of the exhaust gas flow exceeds the limit temperature, air can be supplied to the exhaust gas flow via the air supply device and the combustion air ratio can be increased, for example to values of $\lambda \geq 1$. For example, the air supply device can remain activated for as long as the lambda sensor detects a combustion air ratio $\lambda<1$ and the temperature of the exhaust gas flow exceeds the limit temperature.

On this other hand, if a combustion air ratio $\lambda>1$ is detected via the lambda sensor arranged downstream of the LNT catalyst or the temperature of the exhaust gas flow does not exceed the limit temperature, the SCR catalyst is not at risk of degradation and the exhaust gas flow can be conducted through the SCR catalyst for post-treatment to remove nitrogen oxides without air flow from the air supply device.

Alternatively, the lambda sensor can be arranged upstream of the LNT catalyst so that the combustion air ratio $\lambda$ can be determined. If a combustion air ratio $\lambda<1$ is detected, a rich exhaust gas mix, (e.g. for regeneration of the LNT catalyst), is supplied to the exhaust gas system. From the time at which a combustion air ratio $\lambda<1$ is detected, air can be supplied to the exhaust gas flow via the air supply device, (e.g., the air supply device is activated if the temperature of the exhaust gas flow exceeds the limit temperature). Contact between the SCR catalyst and a rich exhaust gas flow at high temperatures can thus be mitigated.

If the combustion air ratio is $\lambda<1$, it is to be expected that the combustion air ratio downstream of the LNT catalyst will also be $\lambda<1$ after a certain timespan.

This timespan, and therefore also the time t1 at which a combustion air ratio $\lambda<1$ can also be expected downstream of the LNT catalyst, can be determined for example with the aid of model calculations which can be executed online. Such model calculations can take into account, for example, the quantity of nitrogen oxides and/or oxygen stored in the LNT catalyst, the rate of the decrease of the stored nitrogen oxides and/or the stored oxygen as a function of the temperature and the combustion air ratio $\lambda$, the quantity of reductively acting compounds supplied to the LNT catalyst, which can be determined from the combustion air ratio $\lambda$, as well as the temperature. A change in the temperature within the LNT catalyst can also optionally be taken into account. Similar calculations may be conducted onboard the vehicle via data stored in a multi-input look-up table.

When this time t1 is reached, the air supply device can be activated to supply air if the temperature of the exhaust gas flow exceeds the limit temperature. If the air supply device is not already activated when a combustion air ratio $\lambda<1$ is present, but rather at the time t1, the air supply advantageously only takes place when actually needed. Undesired cooling of the exhaust gas flow due to the air supply can be prevented, for example. That is to say, the SCR device may not be preconditioned with oxygen until it is estimated that the environment around the SCR device will be rich. In this way, a delay may be executed, wherein the delay is based on an estimated amount of time needed for the exhaust gas environment around the SCR device to be rich. Once the delay is elapsed, air may flow from the air supply device to the exhaust line.

A time t0, prior to the time t1, can optionally be specified, wherein the air supply device is already activated when the time t0 is reached, so that air is already supplied to the exhaust gas flow from the time t0.

If the air supply device is already activated when the time t0 is reached, it is possible to achieve increased blocking of the SCR catalyst from a rich exhaust gas mix since the air supply device is not activated only when a combustion air ratio $\lambda<1$ is actually detected or a time t1 is reached, but already at the time t0. Possible penetration of a rich exhaust gas mix into the SCR catalyst in the response time of the air supply device, (e.g., between detecting a combustion air ratio $\lambda<1$ or reaching the time t1 and activating the air supply device) can be prevented.

Alternatively, the air supply device can already be activated if there is a request to operate the internal combustion in a rich operating mode or one of the times t1 or t0 is reached. It is possible to dispense with the use of lambda sensors in this alternative. It is not necessary to evaluate combustion air ratios to activate and/or deactivate the air supply device.

In other words, the activation of the air supply device can take place either upon detection of a combustion air ratio $\lambda<1$ via the lambda sensor arranged downstream of the LNT catalyst, when there is a request to operate the internal combustion engine in rich mode, upon detection of a combustion air ratio $\lambda<1$ via the lambda sensor arranged upstream of the LNT catalyst, at the time t1 or at the time t0, wherein the times t1 and t0 are specified with the aid of the combustion air ratio $\lambda$ determined via the lambda sensor arranged upstream of the LNT catalyst.

On the other hand, deactivation of the air supply device can take place either upon detection of a combustion air ratio $\lambda>1$ via the lambda sensor arranged downstream of the LNT catalyst, when there is a request to operate the internal combustion engine in lean mode, upon detection of a combustion air ratio $\lambda>1$ via the lambda sensor arranged upstream of the LNT catalyst or at a time t2, as described below.

If the lambda sensor upstream of the LNT catalyst detects a combustion air ratio $\lambda>1$, then there is no risk to the SCR catalyst and the exhaust gas flow can be conducted through the SCR catalyst for post-treatment irrespective of the temperature of the exhaust gas flow in order to remove nitrogen oxides.

With both arrangement options of the lambda sensor as well as the alternative variants of the exhaust gas system without lambda sensors, contact between the SCR catalyst and a rich exhaust gas mix at high temperatures, (e.g., when the limit temperature is exceeded), can be mitigated since air is supplied to the initially rich exhaust gas mix so that the combustion air ratio increases. The amount of air supplied to the exhaust gas flow is high enough for the combustion air ratio of the exhaust gas flow reaching the SCR catalyst to be $\lambda>1$, in one example.

A decline in the catalyst activity of the SCR catalyst due to contact with a rich exhaust gas mix at high temperatures can thus be prevented. The efficiency of the SCR catalyst during the removal of nitrogen oxides from the exhaust gas flow can be maintained over a relatively long time period. Moreover, the SCR catalyst can be monitored more accurately, (e.g. to determine the desired quantity of urea solution to be supplied and to mitigate an undesired release of excess ammonia), since a decrease of the catalyst activity caused by contact with a rich exhaust gas mix at high temperatures, which would otherwise need to be taken into account, is mitigated. In other words, the predicted desired quantity of urea solution corresponds better to the actual desired quantity.

According to different variant embodiments, the exhaust gas system can comprise a further lambda sensor. This further lambda sensor can be arranged upstream of the LNT catalyst or downstream of the LNT catalyst and upstream of the SCR catalyst, for example, upstream of the air supply device. If the first lambda sensor is arranged upstream of the LNT catalyst, the further lambda sensor is preferably arranged downstream of the LNT catalyst and upstream of the SCR catalyst. If the first lambda sensor is arranged downstream of the LNT catalyst and upstream of the SCR catalyst, the further lambda sensor is preferably arranged upstream of the LNT catalyst. In other words, a lambda sensor can be arranged both upstream of the LNT catalyst as well as downstream of the LNT catalyst and upstream of the SCR catalyst.

The further lambda sensor likewise serves for determining the combustion air ratio and can be constructed in the manner of the lambda sensor described above, for example, as a lambda probe or nitrogen oxide sensor.

The air supply device may be activated depending on the sensor signal of the lambda sensor arranged upstream of the LNT catalyst. For example, upon detection of a combustion air ratio $\lambda<1$, the air supply device can be prepared for activation, (e.g. by preloading a valve of the air supply device).

The deactivation of the air supply device can take place in all cases as soon as a combustion air ratio $\lambda\geq1$ is detected downstream of the LNT catalyst via the lambda sensor arranged downstream of the LNT catalyst or the temperature of the exhaust gas flow no longer exceeding the limit temperature.

Alternatively, the combustion air ratio $\lambda$ can continue to be determined or it can be determined again. It can moreover be checked whether there is a request to operate the internal combustion engine in a stoichiometric or lean operating mode. If $\lambda\geq1$ or such a request exists, the air supply device can be deactivated.

A time t2 at which the combustion air ratio will be $\lambda\geq1$ can optionally be estimated. Deactivation of the air supply device can then take place if the time t2 is reached. Otherwise, the air supply device remains activated.

According to further variant embodiments, the exhaust gas system can furthermore comprise a control and/or regulating unit which is designed and constructed to output a control signal to the air supply device, (e.g. to activate or deactivate the air supply to the exhaust gas flow), depending on sensor signals of the temperature sensor and depending on sensor signals of the lambda sensor(s) and/or an operating mode of the internal combustion engine.

The control and/or regulating unit receives signals of the temperature sensor and either one or more lambda sensors and/or an engine control, which specifies an operating mode for the internal combustion engine as input data, processes these input data and transmits control signals to the air supply device as an actuator in response to the processed input data based on instructions or a programed code corresponding to one or more routines.

The control and/or regulating unit can output control signals as explained above depending on the temperature of the exhaust gas flow, which is determined via the temperature sensor, and the combustion air ratios determined via the lambda sensors, and/or the operating mode of the internal combustion engine. For example, a control signal for activating the air supply device if a combustion air ratio $\lambda<1$ is detected via the lambda sensor arranged downstream of the LNT catalyst and the temperature of the exhaust gas flow exceeds a limit temperature may be sent. A control signal for preparing the air supply device for activation if a combustion air ratio $\lambda<1$ is detected via the lambda sensor arranged upstream of the LNT catalyst and/or the temperature of the exhaust gas flow exceeds a limit temperature may also be sent. A control signal may be sent to activate the air supply device if the time t0 is reached and the temperature of the exhaust gas flow exceeds a limit temperature. A control signal may be sent to deactivate the air supply device if a combustion air ratio $\lambda\geq1$ is detected or the time t2 is reached or the temperature of the exhaust gas flow does not exceed (no longer exceeds) a limit temperature. Further configurations, in which a control signal for activating or deactivating the air supply device is output, are revealed in the options explained above for activating or deactivating the air supply device.

The air supply device may be controlled automatically via the control and/or regulating unit, so that a rapid change between an activated and a deactivated air supply device can be realized and a rapid response to a change in the combustion air ratio and/or the temperature of the exhaust gas flow and/or the operating mode of the internal combustion engine is possible.

According to further variant embodiments, a particulate filter can be arranged downstream of the LNT catalyst and upstream of the SCR catalyst, (e.g. upstream of the air supply device). The particulate filter can be constructed for example as an uncoated diesel particulate filter (DPF), as a particulate filter with a catalyst coating (CDPF) or as a particulate filter with an integrated SCR function (SDPF).

According to further variant embodiments, the exhaust gas system can comprise a supply device for supplying an ammonia-forming agent to the exhaust gas flow, which is arranged downstream of the LNT catalyst, for example downstream of the air supply device, and upstream of the SCR catalyst. The quantity of the ammonia-forming agent supplied via the supply device can be controlled or regulated for example depending on the quantity of air, and therefore oxygen, supplied via the air supply device.

The control and/or regulating unit can optionally also be configured and constructed to output a control signal to the supply device for supplying the ammonia-forming agent to the exhaust gas flow depending on sensor signals of the lambda sensors and the temperature sensor. The quantity of ammonia-forming agent supplied can be adapted for example to the quantity of air supplied to the exhaust gas flow.

A motor vehicle according to the disclosure has an exhaust gas system according to the description above. A motor vehicle refers to a vehicle driven by an internal combustion engine, (e.g. a land, air or water vehicle). In this regard, the above statements for explaining the exhaust gas system according to the disclosure also serve to describe the motor vehicle according to the disclosure. The advantages of the motor vehicle according to the disclosure correspond to those of the exhaust gas system according to the disclosure and its variant embodiments.

A method according to the disclosure for treating an exhaust gas flow generated by an internal combustion engine comprises the features mentioned below, which can be carried out in the sequence mentioned, but also in an a different sequence as desired, wherein the method comprises determining the temperature of the exhaust gas flow upstream of the SCR catalyst, conducting the exhaust gas flow through an LNT catalyst and the SCR catalyst arranged downstream of the LNT catalyst, determining the combustion air ratio $\lambda$ in the exhaust gas flow downstream of the LNT catalyst and upstream of the SCR catalyst and, if the combustion air ratio is $\lambda<1$ and the temperature of the exhaust gas flow exceeds a limit temperature, activating an air supply device arranged downstream of the LNT catalyst and upstream of the SCR catalyst.

A further method according the disclosure for treating an exhaust gas flow generated by an internal combustion engine comprises the features mentioned below, which can be carried out in the sequence mentioned, but also in a different sequence as desired may include determining the temperature of the exhaust gas flow upstream of an SCR catalyst, conducting the exhaust gas flow through an LNT catalyst and the SCR catalyst arranged downstream of the LNT catalyst, determining the combustion air ratio $\lambda$ in the exhaust gas flow upstream of the LNT catalyst and, if the combustion air ratio is $\lambda<1$ and the temperature of the exhaust gas flow exceeds a limit temperature, activating an air supply device arranged downstream of the LNT catalyst and upstream of the SCR catalyst.

A further method according to the disclosure for treating an exhaust gas flow generated by an internal combustion engine comprises the features mentioned below, which can be carried out in the sequence mentioned, but also in a different sequence as desired may include determining the temperature of the exhaust gas flow upstream of an SCR catalyst, conducting the exhaust gas flow through an LNT catalyst and the SCR catalyst arranged downstream of the LNT catalyst and, if the temperature of the exhaust gas flow exceeds a limit temperature and there is a request to operate the internal combustion engine in a rich operating mode, activating an air supply device arranged downstream of the LNT catalyst and upstream of the SCR catalyst.

The methods according to the disclosure can be carried out for example via one of the exhaust gas systems according to the disclosure, which are explained above. In this regard, the above statements for explaining the exhaust gas systems according to the disclosure also serve to describe the methods according to the disclosure. The advantages of the methods according to the disclosure correspond to those of the exhaust gas systems according to the disclosure and their corresponding variant embodiments.

The methods according to the disclosure may be based on determining the combustion air ratio $\lambda$ at the SCR directly or predicting or estimating a change in the combustion air ratio $\lambda$ indirectly with the aid of other parameters, (e.g. with the aid of the combustion air ratio $\lambda$ upstream of the LNT or the operating mode of the internal combustion engine). In other words, there are a plurality of options for determining the combustion air ratio $\lambda$, namely detection via a sensor or estimation via a model. For example, the combustion air ratio determined from the measurement signal of a lambda sensor, (e.g. a lambda sensor arranged upstream of the LNT catalyst or downstream of the LNT catalyst), together with a further combustion air ratio obtained via a model, can be used to control the air supply device, i.e. to decide whether air is supplied to the exhaust gas flow.

At any rate, air may only be supplied to the exhaust gas flow if the temperature of the exhaust gas flow exceeds the limit temperature, (e.g. a limit temperature of 500° C.).

Therefore, if the limit temperature is not exceeded, or no longer exceeded, the activation of the air supply does not take place or the air supply device is deactivated. It is thus achieved that air is only supplied to the exhaust gas flow when the limit temperature is exceeded. Degradation to the SCR catalyst as a result of contact with a rich exhaust gas mix at high temperatures is thus blocked.

According to different variant embodiments, in the event that the temperature of the exhaust gas flow exceeds the limit temperature and either the combustion air ratio is $\lambda<1$ or there is a request to operate the internal combustion engine in a rich operating mode, a time t1 is estimated, for which a model can likewise be used. If the time t1 is not reached, the air supply device remains deactivated. On the other hand, if the time t1 is reached, the air supply device is activated.

A time t0 prior to the time t1 can optionally be specified. The decision as to whether the air supply device is activated can then be based on reaching the time t0 instead of reaching the time t1. If the time t0 is not reached, the air supply device is deactivated or remains in a deactivated state. The air supply device is activated once the time t0 is reached.

In other words, the air supply device is activated if a rich exhaust gas mix is detected when the limit temperature is exceeded upstream of the LNT catalyst, or there is a request to operate the internal combustion engine in a rich operating mode and the subsequently specified time t1 or t0 is reached. Penetration of a rich exhaust gas mix into the SCR catalyst at high temperatures can thus be prevented, wherein the duration of the air supply can be kept as brief as possible to minimize any disadvantageous effects of the air supply, (e.g. an undesired cooling of the exhaust gas flow).

According to further variant embodiments, the method can furthermore comprise a deactivation of the air supply device under certain conditions. Deactivation can take place if the temperature of the exhaust gas flow does not exceed the limit temperature, the combustion air ratio $\lambda$ in the exhaust gas flow downstream of the LNT catalyst and upstream of the SCR catalyst is $\lambda \geq 1$, the combustion air ratio $\lambda$ in the exhaust gas flow upstream of the LNT catalyst is $\lambda \geq 1$ or there is a request to operate the internal combustion engine in a stoichiometric or lean operating mode.

Therefore, depending on the alternative selected, it is possible to determine the combustion air ratio $\lambda$ downstream of the LNT or the combustion air ratio $\lambda$ upstream of the LNT or the existence of a particular request regarding the operation of the internal combustion engine for the first time, again or continuously and to check that the respective condition is being fulfilled.

Each of the methods according to the disclosure can be combined with one of the said conditions. The decision regarding the activation and deactivation of the air supply device may be executed on the basis of the same parameters so that the control or regulation can be kept simple and as few sensors as possible are desired.

Therefore, if activation of the air supply device is triggered as a result of the limit temperature being exceeded and the existence of a request for a rich operating mode, the deactivation is preferably triggered as a result of the limit temperature no longer being exceeded or a request to operate the internal combustion engine in a stoichiometric or lean operating mode. In this combination variant, a lambda sensor may be undesired.

A further preferred combination is the decision regarding the activation or deactivation on the basis of the combustion air ratio $\lambda$ downstream or the combustion air ratio $\lambda$ upstream of the LNT and the temperature.

If the decision regarding the deactivation is based on a combustion air ratio $\lambda \geq 1$ upstream of the LNT or a request to operate the internal combustion engine in a stoichiometric or lean operating mode, a time t2 at which the combustion air ratio downstream of the LNT catalyst will be $\lambda \geq 1$ can be optionally estimated. The air supply device is deactivated if the time t2 is reached. The air supply device remains activated if the time t2 is not reached. The time t2 can likewise be estimated via a model.

In other words, the deactivation does not take place already at the same time as the condition exists, but with a time delay at time t2. Contact between the SCR catalyst and a rich exhaust gas mix at high temperatures can thus be very reliably prevented.

If the combustion air ratio is $\lambda$ upstream of the LNT is $\geq 1$, a time t2 at which the combustion air ratio downstream of the LNT catalyst will be $\lambda \geq 1$ is estimated. After reaching the time t2, it should be assumed that there is no longer a rich exhaust gas mix downstream of the LNT catalyst. The air supply device can be deactivated if the time t2 is reached.

Contact between the SCR catalyst and a rich exhaust gas mix at high temperatures can thus be mitigated. It is advantageously possible to dispense with determining the combustion air ratio $\lambda$ in the exhaust gas flow downstream of the LNT catalyst and any sensors demanded for this.

According to different variant embodiments, the method can furthermore comprise preparing the activation of the air supply device if the combustion air ratio is $\lambda$ upstream of the LNT is <1, there is a request to operate the internal combustion engine in a rich operating mode or the temperature of the exhaust gas flow exceeds a limit temperature.

The air supply to the exhaust gas flow can be prepared by preparing the air supply device, (e.g. pre-loading a valve of the air supply device). The response time of the air supply device can thus be shortened.

According to further variant embodiments, the methods can furthermore comprise supplying an ammonia-forming agent to the exhaust gas flow downstream of the LNT catalyst and upstream of the SCR catalyst.

The supply of the ammonia-forming mix can take place depending on the temperature of the exhaust gas flow, depending on the combustion air ratios $\lambda$ upstream and/or downstream of the LNT and/or depending on an operating mode of the internal combustion engine. The said influential factors can influence the quantity of air to be supplied to the exhaust gas flow so that the quantity of the ammonia-forming agent to be supplied can also be specified depending on the quantity of air supplied. It can thus be achieved that the quantity of ammonia desired by the SCR catalyst for exhaust gas treatment is provided as accurately as possible. An undesired release of ammonia can be mitigated.

FIGS. 1 and 8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows an exhaust gas system 1 connected to an internal combustion engine 2 in a schematic view. The internal combustion engine 2 can be constructed as a self-igniting engine and may be operated for example using diesel fuel. The internal combustion engine generates an exhaust gas flow 3, which is received by the exhaust gas system 1. Described in the flow direction of the exhaust gas flow 3, the exhaust gas system 1 of the exemplary embodiment comprises a lambda sensor 9, an LNT catalyst 4, a lambda sensor 8, an air supply device 5, a temperature sensor 7 for determining the temperature T of the exhaust gas flow 3 and an SCR catalyst 6. The exhaust gas flow 3 may be conducted through an exhaust pipe along which each of the exhaust gas system 1 components may be arranged.

The lambda sensors 8, 9 are constructed as lambda probes. It is alternatively also possible for only one lambda sensors 8, 9 to be present.

The temperature sensor 7, both lambda sensors 8, 9 and the air supply device 5 are signal-connected to the control and/or regulating unit 10, which can output a control signal to the air supply device 5 depending on the signals of the lambda sensors 8, 9 and the temperature sensor 7.

The SCR catalyst 6 can optionally also comprise a particulate filter functionality and be constructed as an SDPF catalyst, (e.g., a particulate filter combined with the SCR catalyst). As illustrated in FIG. 1, a supply device 11 for supplying an ammonia-forming agent to the exhaust gas flow 3, (e.g. urea solution), can be arranged between the air supply device 5 and the temperature sensor 7 so that the SCR catalyst 6 can receive the quantity of ammonia desired for conversion of the nitrogen oxides. The supply device 11 can likewise be optionally controlled via the control and/or regulating unit 10.

The combustion air ratio $\lambda$ of the exhaust gas flow 3 exiting the internal combustion engine 2 can be specified by a corresponding engine control. For example, the combustion air ratio $\lambda$ may be greater than or equal than 1 through a plurality of engine operating modes. The exhaust gas flow 3 is then post-treated in the exhaust gas system 1 via the LNT catalyst 4 and the SCR catalyst 6 without additional air being supplied to the exhaust gas flow 3 via the air supply device 5. Further exhaust gas post-treatment devices, (e.g. particulate filters), can be optionally present. There is also the option of returning some of the exhaust gas again, mixed with fresh air, to the internal combustion engine 2 as supply air. This is known as exhaust gas recirculation (EGR).

To regenerate the LNT catalyst, the internal combustion engine 2 can occasionally be operated with a rich air/fuel mix. Accordingly, the exhaust gas flow 3 exiting the internal combustion engine 2 then also has a combustion air ratio $\lambda$ of less than 1. The conclusion of the regeneration can be established with reference to a combustion air ratio $\lambda_1<1$ downstream of the LNT catalyst 4. $\lambda_1$ may correspond to feedback from the lambda sensor 8. The operation of the internal combustion engine 2 with the rich air/fuel mix can take place until the conclusion of the regeneration, but also for a longer time span, (e.g., beyond the lambda breakthrough).

Via the exhaust gas system 1, an exhaust gas mix with a combustion air ratio $\lambda_1<1$, which is produced when the internal combustion engine 2 is operated with a rich air/fuel mix, can be prevented from arriving in the SCR catalyst 6 at high temperatures T, i.e. temperatures T which exceed a limit temperature TG. To this end, the exhaust gas system 1 can be operated as described below with reference to FIGS. 2, 3 and 4.

Figure 2:
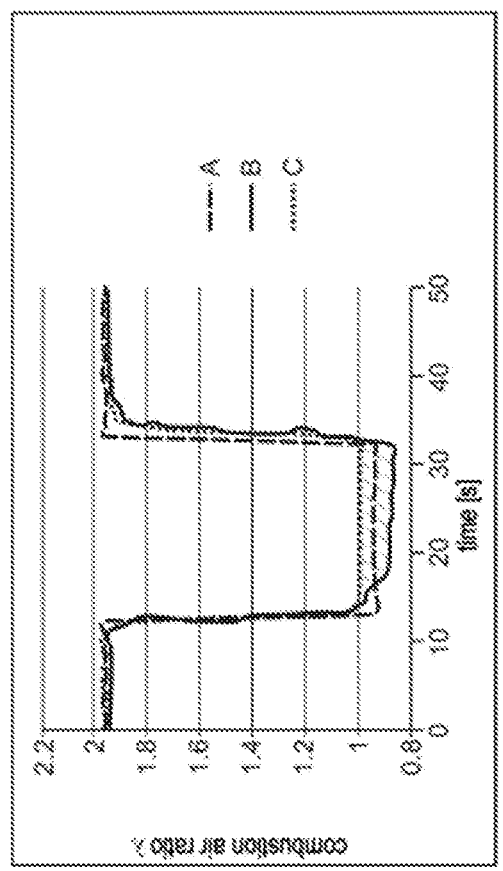
FIG. 2 illustrates progressions of a combustion air ratio.

Turning now to FIG. 2, it shows the dependence of the combustion air ratio $\lambda$ over time at different positions of the exhaust gas system 1. The curve A shows the progression of a combustion air ratio $\lambda_2$, wherein $\lambda_2$ differs from $\lambda_1$ in that $\lambda_2$ is sensed upstream of the LNT 4 via the lambda sensor 9 and $\lambda_1$ is sensed via lambda sensor 8 downstream of the LNT of FIG. 1. At first, $\lambda_2>1$ applies, (e.g., a lean exhaust gas mix is detected). At about 10 seconds, a lean-rich jump takes place, for example in that the internal combustion engine 2 is no longer operated with a lean air/fuel mix, but with a rich air/fuel mix, for example to regenerate the LNT catalyst 4. Accordingly, a rich exhaust gas mix, (e.g., $\lambda_2<1$), is also detected upstream of the LNT catalyst 4. At about 30 seconds, a rich-lean jump takes place, (e.g., the internal combustion engine 2 is now operated with a lean air/fuel mix again). Accordingly, $\lambda_2>1$ is detected with a slight time delay.

The curve C shows a desired progression of the combustion air ratio $\lambda$ upstream of the SCR catalyst 6. This combustion air ratio is a minimum of 1 so that a rich exhaust gas does not reach the SCR catalyst 6.

However, without further measures, (e.g. an air supply), the progression of the combustion air ratio $\lambda$ upstream of the SCR catalyst 6, which in this case corresponds to the combustion air ratio $\lambda_1$, corresponds to the progression of the curve B and a rich exhaust gas mix arrives in the SCR catalyst 6 between about 15 to 35 seconds.

To prevent this, air is supplied to the exhaust gas flow 3 downstream of the LNT catalyst 4 and upstream of the SCR catalyst 6 in such a quantity that the combustion air ratio $\lambda$ upstream of the SCR catalyst 6 is increased until it corresponds at least to the curve C, (e.g., there is at least a stoichiometric combustion air ratio). The quantity of air or oxygen desired for this is illustrated shaded in FIG. 2, and may correspond to the difference between the curves C and B. While the shaded area shows an adjustment of the exhaust gas mix from rich to stoichiometric, it will be appreciated that the air flow rate from the air supply device may be adjusted to increase the air/fuel ratio of the exhaust gas mix to a lean ratio.

Figure 3:
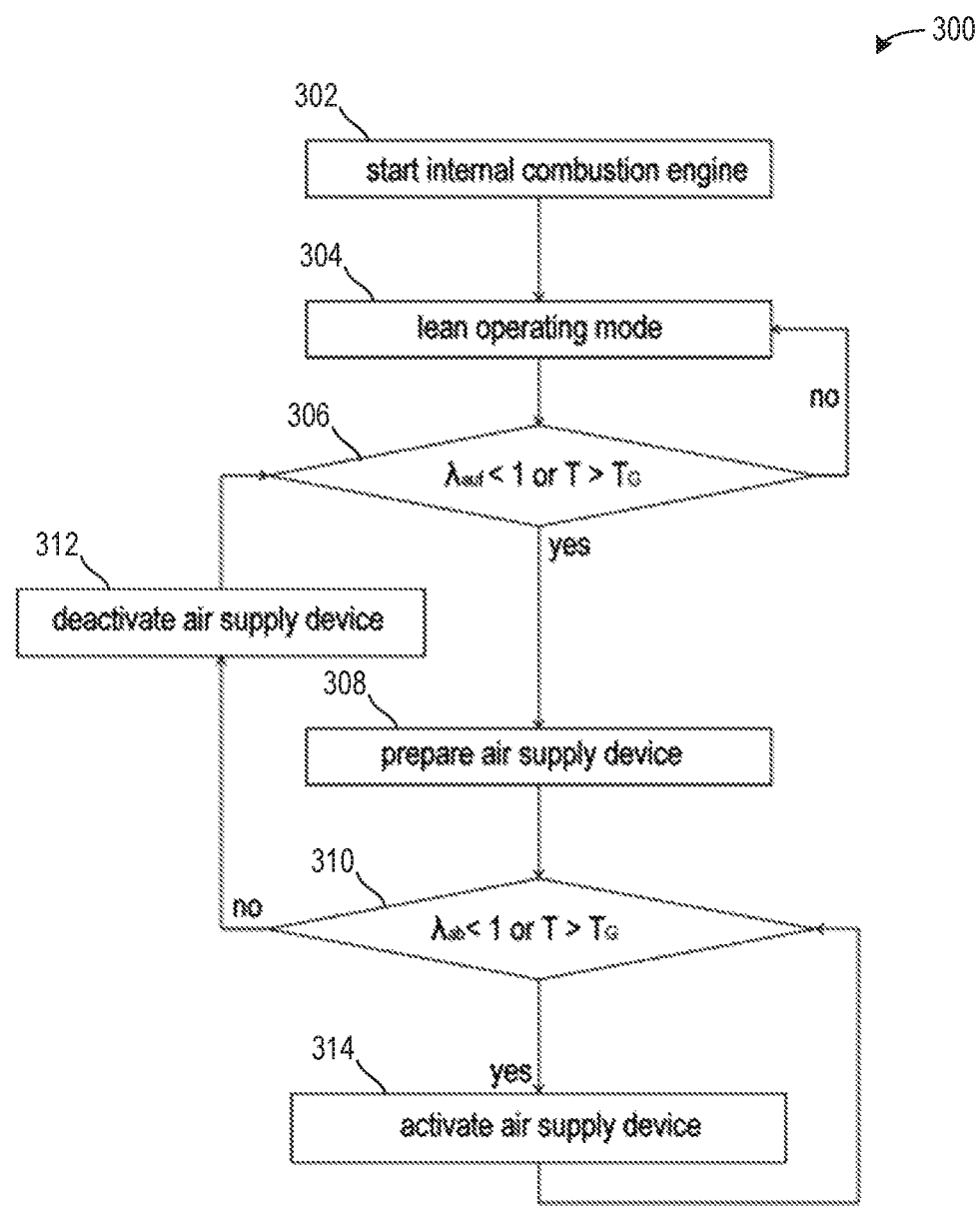
FIG. 3 illustrates a method for treating an exhaust gas flow.

Turning now to FIG. 3, it shows a flowchart of a method 300 for treating an exhaust gas flow 3 generated by an internal combustion engine 2. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 8. The controller may employ engine actuators of the engine system to adjust engine operation, according to the methods described below.

After the internal combustion engine 2 is started at 302, it is initially operated in a lean operating mode at 304. Moreover, the temperature T of the exhaust gas flow 3 is determined and compared to a limit temperature TG of e.g. 500° C. at 306. The temperature T of the exhaust gas flow 3 is preferably compared to the limit temperature TG immediately upstream of the SCR catalyst 6. The combustion air ratio $\lambda_2$ in the exhaust gas flow 3 upstream of the LNT catalyst 4 is determined via the further lambda sensor 9.

If the combustion air ratio $\lambda_2$ is not less than 1 and T<TG applies, the lean operating mode is continued without further measures. That is to say, the air supply device does not flow air to the exhaust passage. On the other hand, if a combustion air ratio $\lambda_2<1$ is determined or T>TG applies, then the air supply device 5 is prepared for activation at 308.

Furthermore, the combustion air ratio $\lambda_1$ downstream of the LNT catalyst 4 and upstream of the SCR catalyst 6 is determined via the lambda sensor 8. So long as the combustion air ratio $\lambda_1$ is not less than 1 or T≤TG applies at 310, the air supply device 5 remains in a prepared, but deactivated state where its air flow rate is substantially zero at 312. The exhaust gas flow 3 flows through the SCR catalyst 6 without further measures.

If a combustion air ratio $\lambda_1 < 1$ is determined and T>TG applies, the air supply device 5 is activated so that air is supplied to the exhaust gas flow 3 at 314. The air supply device 5 remains in an activated state so long as the combustion air ratio is $\lambda_1 < 1$ and T>TG applies. If a combustion air ratio $\lambda_1 \geq 1$ is determined or T<TG applies, the air supply device 5 is deactivated again.

Figure 4:
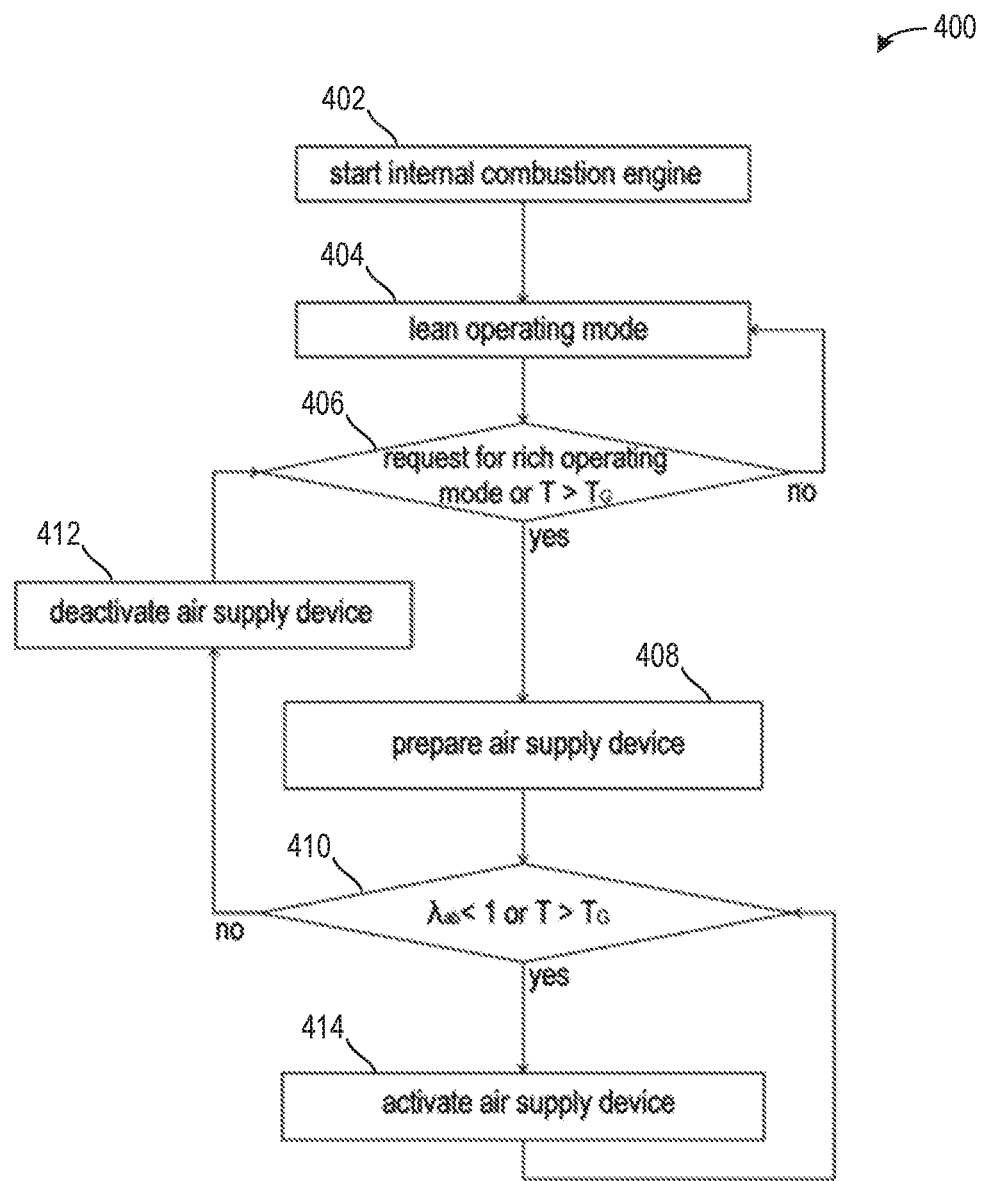
FIG. 4 illustrates an additional embodiment of the method for treating an exhaust gas flow.

The sequence of an alternative method 400 for treating an exhaust gas flow 3 generated by an internal combustion engine 2 is illustrated schematically in FIG. 4. In contrast to the method according to FIG. 3, the combustion air ratio $\lambda_2$ is not determined and it is possible to omit the further lambda sensor 9. The preparation for the activation of the air supply device 5 takes place if there is a request for a rich operating mode of the internal combustion engine 2 at 406, (e.g., the engine control of the internal combustion engine 2 outputs a corresponding control signal), or T>TG applies. As such, steps 402, 404, 408, 410, 412, and 414 of method 400 may be substantially identical to steps 302, 304, 308, 310, 312, and 314 of method 300 of FIG. 3.

Figure 5:
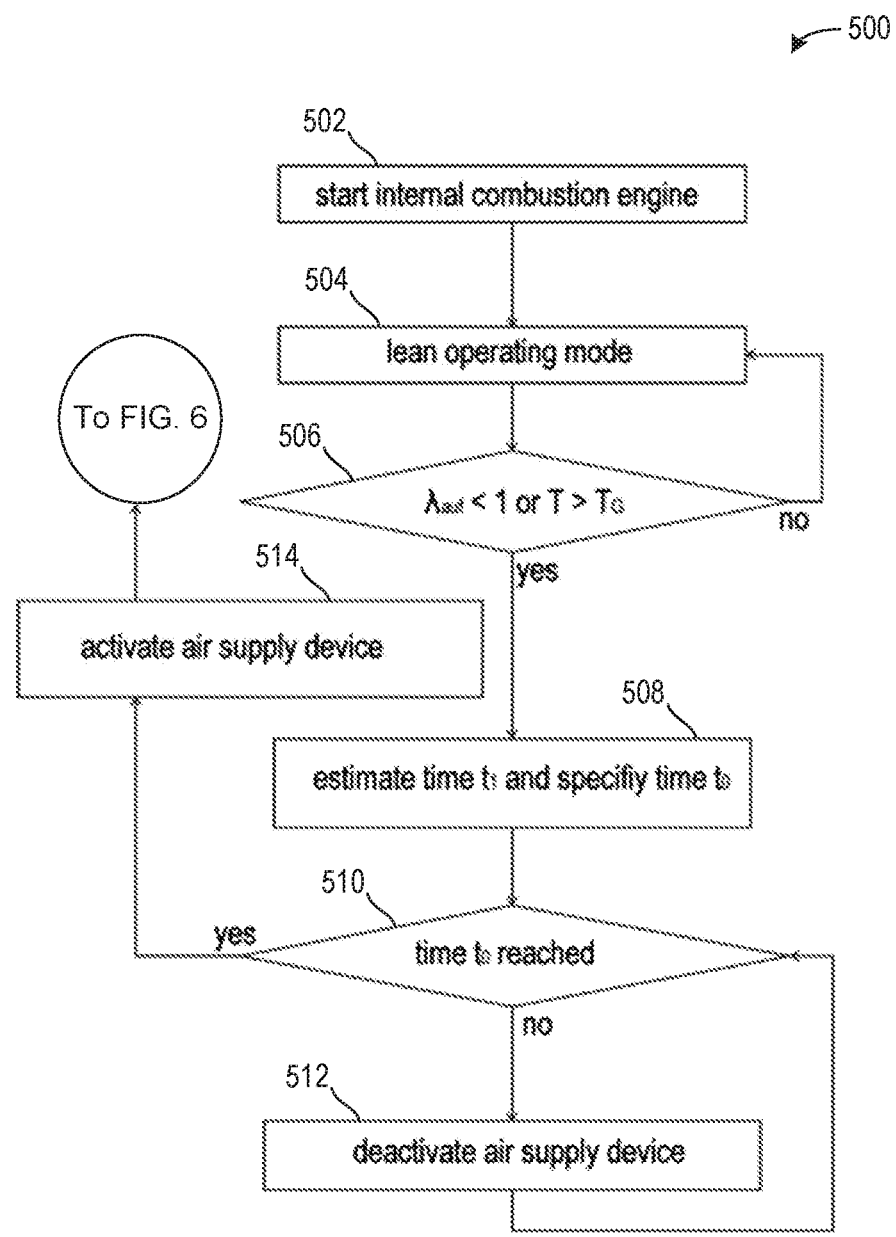
FIG. 5 illustrates an additional embodiment of the method for treating an exhaust gas flow.

The sequence of a further alternative method 500 for treating an exhaust gas flow 3 generated by an internal combustion engine 2 is illustrated schematically in FIG. 5. In contrast to the method 300 according to FIG. 3, preparation for the activation of the air supply device 5 is not provided, although it can be optionally added. Method steps 502 and 504 of the method 500 may be substantially identical to method steps 302 and 304 of the method 300 of FIG. 3.

For a combustion air ratio $\lambda_2 < 1$ and T>TG at 506, the time t1 at which the combustion air ratio $\lambda_1$ downstream of the LNT catalyst 4 will become lower 1 is estimated by means of a model at 508. The time t0 is moreover specified, which, time-wise, is prior to the time t1.

If the time t0 is not yet reached at 510, the air supply device 5 is or remains deactivated at 512. It is checked again whether the time t0 is reached. If the time t0 is reached, the air supply device 5 is activated at 514 so that air is supplied to the exhaust gas flow 3.

Figure 6:
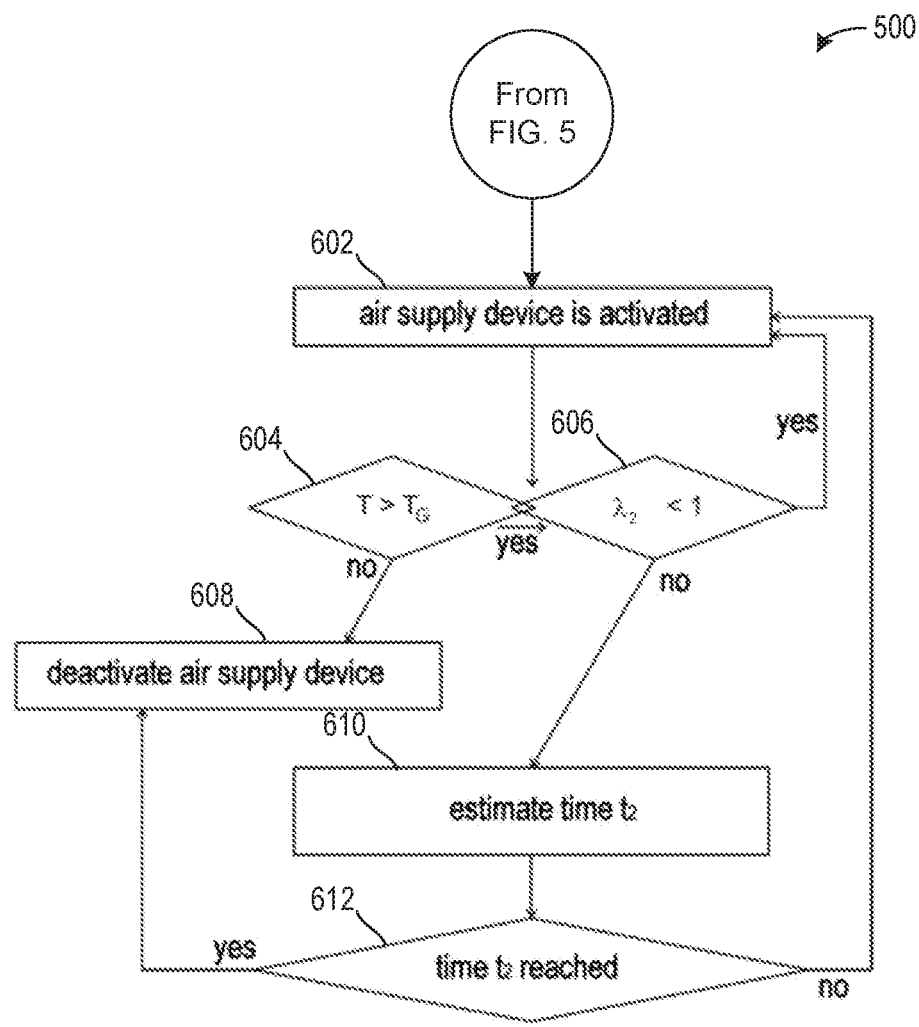
FIG. 6 illustrates a further progression of the method shown in FIG. 5

A further possible progression of the method 500 according to FIG. 5 is shown in FIG. 6. This starts with an activated air supply device at 602. Air is therefore supplied to the exhaust gas flow 3. In a next step, the combustion air ratio $\lambda_2$ at 606 and the temperature T of the exhaust gas flow 3 at 604 are determined. If $\lambda_2 < 1$ and T>TG, i.e. there is a rich exhaust gas mix upstream of the LNT catalyst 4 at high temperatures, the air supply device 5 continues to remain activated and air is supplied to the exhaust gas flow 3.

If the temperature T does not exceed the limit temperature TG, the air supply device 5 is deactivated at 608. On the other hand, if $\lambda_2 < 1$ does not apply, (e.g., there is a stoichiometric or lean exhaust gas mix upstream of the LNT catalyst 4), the time t2 at which the combustion air ratio downstream of the LNT catalyst will be $\lambda_1 \geq 1$ is estimated at 610.

If the time t2 is not yet reached at 612, the air supply device 5 continues to remain activated at 602. On the other hand, if the time t2 is reached, the air supply device 5 is deactivated at 608. Alternatively, following on from the method 500 according to FIG. 5, the combustion air ratio $\lambda_1$ downstream of the LNT catalyst 4 and upstream of the SCR catalyst 6 can be determined (not shown in FIG. 6), for example via the lambda sensor 8 of FIG. 1. If a combustion air ratio $\lambda_1 \geq 1$ is determined or T≤TG applies, the air supply device 5 is deactivated again.

FIG. 7 shows the proportion of converted nitrogen oxides depending on temperature for SCR catalysts, which may be used in SCR catalyst 6 of FIG. 1, under different conditions. It can be seen that the proportions of converted nitrogen oxides for an unused SCR catalyst, 6 i.e. a catalyst preconditioned at 600° C., and for an SCR catalyst 6 exposed to lean conditions at 650° C. are approximately identical.

In contrast, it can be seen from FIG. 7 that the proportion of converted nitrogen oxides in an SCR catalyst 6 which is alternately exposed to lean and rich conditions at 650° C., i.e. an SCR catalyst 6 used according to the prior art, is reduced considerably.

As a result of the air supply, it is achieved that the SCR catalyst 6 is not exposed to undesired rich conditions at high temperatures. The proportion of converted nitrogen oxides therefore corresponds to the curve "SCR lean conditions at 650° C." in FIG. 7. Compared to the curve "SCR lean-rich conditions at 650° C.", a considerable improvement can be seen, i.e. a greater proportion of nitrogen oxides is converted and the emissions are reduced.

The monitoring of the SCR catalyst 6 is furthermore simplified by the disclosure. Conventionally, the ammonia storage capacity of the SCR catalyst 6 is namely monitored to supply an optimum quantity of urea solution to the SCR catalyst 6 and prevent an undesired release of ammonia. The ammonia storage capacity in this case is predicted with the aid of a model which takes into account the supplied quantities of nitrogen oxides and ammonia. Moreover, the normal aging of the SCR catalyst 6 under lean conditions as a result of high temperatures and the presence of water is taken into account. On the other hand, a decline in the SCR catalyst 6 due to the supply of a rich exhaust gas mix is not taken into account.

This leads to a deviation of the actual ammonia storage capacity from the predicted ammonia storage capacity in the event of decline due to a rich exhaust gas mix. Since such a decline is substantially prevented by the present disclosure, which leads to better agreement between the predicted and actual ammonia storage capacity. Consequently, the supplied quantity of urea solution also corresponds more accurately to the desired quantity of urea solution and an undesired release of ammonia can be prevented.

FIG. 8 shows a schematic depiction of a hybrid vehicle system 806 that can derive propulsion power from engine system 808 and/or an on-board energy storage device. An energy conversion device, such as a generator, may be operated to absorb energy from vehicle motion and/or engine operation, and then convert the absorbed energy to an energy form suitable for storage by the energy storage device.

Engine system 808 may include an engine 810 having a plurality of cylinders 830. Engine 810 may be used similarly to engine 2 of FIG. 1 in one example. Engine 810 includes an engine intake 823 and an engine exhaust 825. Engine intake 823 includes an air intake throttle 862 fluidly coupled to the engine intake manifold 844 via an intake passage 842. Air may enter intake passage 842 via air filter 852. Engine exhaust 825 includes an exhaust manifold 848 leading to an exhaust passage 835 that routes exhaust gas to the atmosphere. Engine exhaust 825 may include one or more emission control devices 870 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 808 is a boosted engine system, the engine system may further include a boosting device, such as a turbocharger (not shown).

In one example, the emission control device 870 is a first emission control device arranged upstream of a second emission control device 872 relative to a direction of exhaust gas flow. An air supply device 874 may be arranged at a junction between the first emission control device 870 and the second emission control device 872. The air supply device 874 may be activated in response to an exhaust gas mix being rich and an exhaust gas temperature being greater than a limit temperature. In some examples, the air supply device 874 may be a compressor. Additionally or alternatively, the air supply device 874 may be an auxiliary device configured to flow air into the engine exhaust 825.

Vehicle system 806 may further include control system 814. Control system 814 is shown receiving information from a plurality of sensors 816 (various examples of which are described herein) and sending control signals to a plurality of actuators 881 (various examples of which are described herein). As one example, sensors 816 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 806. As another example, the actuators may include the throttle 862.

Controller 812 may be configured as a conventional microcomputer including a microprocessor unit, input/output ports, read-only memory, random access memory, keep alive memory, a controller area network (CAN) bus, etc. Controller 812 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 806 comprises multiple sources of torque available to one or more vehicle wheels 859. In other examples, vehicle 806 is a conventional vehicle with only an engine, or an electric vehicle with only electric machine(s). In the example shown, vehicle 806 includes engine 810 and an electric machine 851. Electric machine 851 may be a motor or a motor/generator. A crankshaft of engine 810 and electric machine 851 may be connected via a transmission 854 to vehicle wheels 859 when one or more clutches 856 are engaged. In the depicted example, a first clutch 856 is provided between a crankshaft and the electric machine 851, and a second clutch 856 is provided between electric machine 851 and transmission 854. Controller 812 may send a signal to an actuator of each clutch 856 to engage or disengage the clutch, so as to connect or disconnect crankshaft from electric machine 851 and the components connected thereto, and/or connect or disconnect electric machine 851 from transmission 854 and the components connected thereto. Transmission 854 may be a gearbox, a planetary gear system, or another type of transmission. The powertrain may be configured in various manners including as a parallel, a series, or a series-parallel hybrid vehicle.

Electric machine 851 receives electrical power from a traction battery 861 to provide torque to vehicle wheels 859.

Electric machine 851 may also be operated as a generator to provide electrical power to charge battery 861, for example during a braking operation.

Turning now to FIG. 9, it shows method 900 for adjusting a fuel content of exhaust gas upstream of a SCR device.

The method 900 begins at 902, which may include determining, estimating, and/or measuring one or more current engine operating parameters. The current engine operating parameters may include, but are not limited to, one or more of a manifold vacuum, a throttle position, an engine speed, a vehicle speed, an exhaust gas temperature, and an air/fuel ratio.

The method 900 proceeds to 904, which may include determining if an air/fuel ratio is greater than or equal to 1 directly upstream of the SCR. The air/fuel ratio directly upstream of the SCR may be substantially equal to the $\lambda_1$ described above. Additionally or alternatively, the air/fuel ratio directly upstream of the SCR may be equal to an air/fuel ratio downstream of the LNT. In some examples, the air/fuel ratio may increase following flowing through the LNT as some amount of hydrocarbons in the exhaust gas may be consumed by the LNT during its regeneration. If the air/fuel ratio is greater than or equal to 1 then the method 900 proceeds to 906 to maintain current operating parameters and does not activate the air supply device.

If the air/fuel ratio is less than 1, then the method 900 proceeds to 908, which may include determining if an exhaust gas temperature is less than the limit temperature. As described above, the limit temperature may be based on a temperature at which rich exhaust gases may degrade the SCR catalyst. In one example, the limit temperature is equal to 500° C. If the exhaust gas temperature is less than the limit temperature, then the method 900 proceeds to 906 as described above. In this way, even if the exhaust gas flowing to the SCR device is rich, the air supply device is not activated as the cooling provided by the air supply device may further decrease an efficiency of the SCR for treating nitrogen oxides. Additionally, the rich exhaust gas below the limit temperature may not degrade the SCR, which may result in air not being requested.

If the exhaust gas temperature is greater than or equal to the limit temperature, then the method 900 proceeds to 910 to activate the air supply device.

At 912, the method 900 may include flowing air into a portion of the exhaust passage upstream of the SCR catalyst and downstream of the LNT. In one example, a flow rate of the air supply device may be adjusted based on the air/fuel ratio. For example, as the air/fuel ratio becomes more rich, the flow rate of the air supply device may increase. Additionally or alternatively, the flow rate may be set to increase the air/fuel ratio to at least a stoichiometric air/fuel ratio. As such, by increasing the air/fuel ratio to the stoichiometric air/fuel ratio, degradation to the SCR catalyst via hot, rich exhaust gases may be mitigated. The method 900 may continue to monitor the air/fuel ratio and the exhaust temperature. If one of the air/fuel ratio is equal to or greater than 1 or if the exhaust temperature falls below the limit temperature, then the air supply device may be deactivated and air may no longer flow between the LNT and the SCR.

In some examples of the method 900, the method 900 may further include a delay, wherein the delay is based on an indication that exhaust gas is rich or that an exhaust gas temperature is greater than the limit temperature at a portion of the exhaust passage upstream of the SCR catalyst and not at the SCR catalyst. As such, the delay may be based on an amount of time needed to the environment around the SCR catalyst to become rich and for the temperature to exceed the limit temperature. Once both conditions are met, the delay may be complete and the air supply device may be activated.

Turning now to FIG. 10, it shows a graph 1000 illustrating adjustments to an exhaust gas treatment arrangement in response to one or more sensed conditions. Plot 1010 illustrates a LNT regeneration request, plot 1020 illustrates a feedback from a lambda sensor upstream of the LNT and dashed line 1022 illustrates a stoichiometric air/fuel ratio, plot 1030 illustrates a feedback from a lambda sensor downstream of the LNT and upstream of the SCR catalyst, dashed line 1032 illustrates a stoichiometric air/fuel ratio, dashed line 1034 illustrates an increased air/fuel ratio as a result of air flow from the air supply device, plot 1040 illustrates an exhaust temperature and dashed line 1042 illustrates a temperature limit, and plot 1050 illustrates an air supply flow rate of the air supply device. In one example, the increased air/fuel ratio is an air/fuel ratio sensed by the lambda sensor downstream of the LNT and upstream of the SCR catalyst. As such, plot 1030, when dashed line 1034 is illustrated, may be representative of an air/fuel ratio without the air supplied from the air supply device. Time increases from a left to a right side of the figure.

Prior to t1, the LNT requests a regeneration (plot 1010). The regeneration may occur in response to a load of the LNT exceeding a threshold load in terms of $NO_x$ or sulfur stored thereon. Additionally or alternatively, the threshold load may be based on a time elapsed, wherein nitrogen or sulfur containing compounds captured by the LNT are tracked over time. Air/fuel ratios measured by the lambda sensors upstream and downstream of the LNT are both above 1, indicating that an engine is operating lean. As such, the LNT regeneration is not yet occurring despite the request. At t1, engine operating conditions are adjusted to a rich operation so that the LNT regeneration may be executed.

Between t1 and t2, the LNT regeneration occurs as the lambda value upstream of the LNT (e.g., $\lambda_2$) falls below 1 to a rich air/fuel ratio. The hydrocarbons in the exhaust gas may assist in desorption and conversion of the nitrogen oxides to nitrogen gas and water. However, the lambda value downstream of the LNT and upstream of the SCR (e.g., $\lambda_1$) may remain above 1 between t1 and t2. As such, even though the exhaust gas temperature is greater than the limit temperature, the flow rate from the air supply device remains equal to substantially zero. At t2, the lambda value downstream of the LNT and upstream of the SCR catalyst is equal to the stoichiometric lambda value (e.g., 1). In this way, a portion of time between t1 and t2 may represent a delay applied to activating the air supply device.

Between t2 and t3, the LNT regeneration continues. The lambda value upstream of the LNT continues to decrease to a richer air/fuel ratio. The lambda value downstream of the LNT and upstream of the SCR catalyst falls below 1. As such, the air supply flow rate is increased to a flow rate greater than zero to mitigate exposure of the SCR catalyst to rich exhaust gas with a temperature above the limit temperature. In one example, the air supply flow rate is set to a flow rate based on a difference between the lambda downstream LNT value and the stoichiometric air/fuel ratio. As such, the corrected air/fuel ratio (e.g., the actual air/fuel ratio that reaches the SCR catalyst) is equal to 1. In this way, between t2 and t3, the plot 1030 represents and air/fuel ratio for exhaust gas without the air supply. In this way, degradation of the SCR catalyst may be mitigated. At t3, the exhaust gas temperature may begin to decrease as the air flow from the air supply device may cool the exhaust gas.

Between t3 and t4, the air supply flow rate continues to increase as the lambda value downstream of the LNT and upstream of the SCR catalyst falls further below the stoichiometric air/fuel ratio. The exhaust gas temperature continues to decrease toward the limit temperature. At t4, the exhaust gas temperature is equal to the limit temperature.

Between t4 and t5, the exhaust gas temperature falls below the limit temperature. As such, a likelihood of degradation to the SCR catalyst may be reduced. In response, the air supply flow rate is also reduced to zero. In this way, rich exhaust gas may flow to the SCR catalyst during the LNT regeneration. At t5 and after, the LNT regeneration continues, wherein lambda values for exhaust gas upstream and downstream of the LNT are below stoichiometric. The air supply flow rate remains zero as the air supply device is deactivated due to the exhaust temperature being less than the limit temperature.

In this way, an exhaust gas composition may be adjusted upstream of an SCR catalyst and downstream of a LNT in response to the exhaust gas being rich and the exhaust gas temperature being greater than a limit temperature. The exhaust gas composition may be adjusted via an air supply device, wherein a flow rate from the air supply device may be adjusted to increase the exhaust gas composition to at least a stoichiometric composition. The technical effect of increasing an oxygen content of exhaust gas flowing to the SCR device when the exhaust gas is rich and its temperature is higher than the limit temperature is to mitigate degradation to the SCR device.

In another representation, an exhaust gas system for receiving an exhaust gas flow generated by an internal combustion engine, comprises an LNT catalyst, an air supply device arranged downstream of the LNT catalyst, an SCR catalyst arranged downstream of the air supply device, a temperature sensor for determining the temperature of the exhaust gas flow upstream of the SCR catalyst, and at least one lambda sensor arranged upstream of the LNT catalyst or downstream of the LNT catalyst and upstream of the SCR catalyst.

A first example of the exhaust gas system further includes where a further lambda sensor arranged upstream of the LNT catalyst or downstream of the LNT catalyst and upstream of the SCR catalyst, wherein the at least one lambda sensor is a first lambda sensor and the further lambda sensor is a second lambda sensor.

A second example of the exhaust gas system, optionally including the first example, further includes where a control and/or regulating unit, which is configured and constructed to output a control signal to the air supply device depending on sensor signals of the temperature sensor and depending on sensor signals of the first and second lambda sensors, and/or an operating mode of the internal combustion engine.

A third example of the exhaust gas system, optionally including the first and/or second examples, further includes an LNT catalyst, an air supply device arranged downstream of the LNT catalyst, an SCR catalyst arranged downstream of the air supply device, a temperature sensor for determining the temperature of the exhaust gas flow upstream of the SCR catalyst, and a control and/or regulating unit, which is designed and constructed to output a control signal to the air supply device depending on sensor signals of the temperature sensor and an operating mode of the internal combustion engine.

A fourth example of the exhaust gas system, optionally including one or more of the first through third examples, further includes where a particulate filter arranged downstream of the LNT catalyst and upstream of the SCR catalyst.

A fifth example of the exhaust gas system, optionally including one or more of the first through fourth examples, further includes where a supply device is arranged upstream of the SCR catalyst and downstream of the LNT catalyst for the purpose of supplying an ammonia-forming agent to the exhaust gas flow.

A sixth example of the exhaust gas system, optionally including one or more of the first through fifth examples, further includes where the control and/or regulating unit is furthermore designed and constructed to output a control signal to the supply device for supplying the ammonia-forming agent to the exhaust gas flow depending on sensor signals of the temperature sensor and depending on sensor signals of the first and second lambda sensors and/or an operating mode of the internal combustion engine.

In another representation, a method for treating an exhaust gas flow generated by an internal combustion engine, comprises determining a temperature T of the exhaust gas flow upstream of an SCR catalyst, conducting the exhaust gas flow through an LNT catalyst and the SCR catalyst arranged downstream of the LNT catalyst, determining the combustion air ratio $\lambda_1$ in the exhaust gas flow downstream of the LNT catalyst and upstream of the SCR catalyst, and if the combustion air ratio is $\lambda_1 < 1$ and the temperature T of the exhaust gas flow exceeds a limit temperature TG, activating an air supply device arranged downstream of the LNT catalyst and upstream of the SCR catalyst.

In another representation, additionally or alternatively, a method for treating an exhaust gas flow generated by an internal combustion engine, comprises determining a temperature T of the exhaust gas flow upstream of an SCR catalyst, conducting the exhaust gas flow through an LNT catalyst and the SCR catalyst arranged downstream of the LNT catalyst, determining the combustion air ratio $\lambda_2$ in the exhaust gas flow upstream of the LNT catalyst, and if the combustion air ratio is $\lambda_2 < 1$ and the temperature T of the exhaust gas flow exceeds a limit temperature TG, activating an air supply device arranged downstream of the LNT catalyst and upstream of the SCR catalyst.

In another representation, additionally or alternatively, a method for treating an exhaust gas flow generated by an internal combustion engine, comprises determining a temperature T of the exhaust gas flow upstream of an SCR catalyst, conducting the exhaust gas flow through an LNT catalyst and the SCR catalyst arranged downstream of the LNT catalyst, and if the temperature T of the exhaust gas flow exceeds a limit temperature TG and there is a request to operate the internal combustion engine in a rich operating mode, activating an air supply device arranged downstream of the LNT catalyst and upstream of the SCR catalyst.

A first example of one of the above methods further includes where if the temperature T of the exhaust gas flow exceeds the limit temperature TG and either the combustion air ratio is $\lambda_{2<1}$ or there is a request to operate the internal combustion engine in a rich operating mode, estimating a time $t_1$ at which the combustion air ratio $\lambda_1$ downstream of the LNT catalyst will be $\lambda_1 < 1$, wherein the air supply device remains deactivated if the time $t_1$ is not reached and wherein the air supply device is activated if the time $t_1$ is reached.

A second example of one of the above methods, optionally including the first example, further includes where specifying a time to prior to the time $t_1$, wherein the air supply device remains deactivated if the time to is not reached, and wherein the air supply device is activated if the time to is reached.

A third example of one or more above methods, optionally including the first and/or second examples, further includes where deactivating the air supply device if the temperature T of the exhaust gas flow does not exceed the limit temperature $T_G$, or the combustion air ratio $\lambda_1$ in the exhaust gas flow downstream of the LNT catalyst and upstream of the SCR catalyst is $\lambda_1 \geq 1$, or the combustion air ratio $\lambda_2$ in the exhaust gas flow upstream of the LNT catalyst is $\lambda_2 \geq 1$, or there is a request to operate the internal combustion engine in a stoichiometric or lean operating mode.

A fourth example of one or more of the above methods, optionally including one or more of the first through third examples, further includes if the combustion air ratio is $\lambda_2 \geq 1$ or there is a request to operate the internal combustion engine in a stoichiometric or lean operating mode, estimating a time t2 at which the combustion air ratio downstream of the LNT catalyst will be $\lambda_1 \geq 1$, wherein the air supply device is deactivated if the time t2 is reached and wherein the air supply device remains activated if the time t2 is not reached.

A fifth example of one or more of the above methods, optionally including one or more of the first through fourth examples, further includes where preparing the activation of the air supply device if the combustion air ratio in the exhaust gas flow upstream of the LNT catalyst is $\lambda_{2<1}$, there is a request to operate the internal combustion engine in a rich operating mode or the temperature T of the exhaust gas flow exceeds the limit temperature TG.

A sixth example of one or more of the above methods, optionally including one or more of the first through fifth examples, further includes where supplying an ammonia-forming agent to the exhaust gas flow downstream of the LNT catalyst and upstream of the SCR catalyst.

An embodiment of a system comprises a lean-$NO_x$-trap arranged upstream of a selective-catalytic-reduction catalyst in an exhaust passage, an air supply device arranged between the lean-NOR-trap and the selective-catalytic-reduction catalyst, and a controller with computer-readable instructions stored thereon that when executed enable the controller to adjust an air flow from the air supply device when an exhaust gas is rich and an exhaust gas temperature is greater than a threshold. A first example of the system, further includes where the air supply device is shaped to admit air into the exhaust passage upstream of the selective-catalytic-reduction catalyst and the lean-$NO_x$-trap, and where the air flow is increased as a difference between a lambda value of the exhaust gas and a stoichiometric lambda increases. A second example of the system, optionally including the first example, further includes where the lambda value is provided by an exhaust gas sensor arranged upstream of the selective-catalytic-reduction catalyst and downstream of the lean-NOR-trap. A third example of the system, optionally including the first and/or second examples, further includes where the lambda value is provided by an exhaust gas sensor arranged upstream of the lean-$NO_x$-trap. A fourth example of the system, optionally including one or more of the first through third examples, further includes where the instructions further enable the controller to delay the air flow from the air supply device in response to the exhaust gas being rich upstream of the lean-$NO_x$-trap and the exhaust gas being stoichiometric or lean between the lean-$NO_x$-trap and the selective-catalytic-reduction catalyst, wherein the delay is based on an estimate of when the exhaust gas between the lean-$NO_x$-trap and the selective-catalytic-reduction catalyst will be rich. A fifth example of the system, optionally including one or more of the first through fourth examples, further includes where the instructions further enable the controller to decrease the air flow from the air supply device in response to the exhaust gas being rich and the exhaust gas temperature being less than the threshold. A sixth example of the system, optionally including one or more of the first through fifth examples, further includes where the instructions further enable the controller to delay the air flow from the air supply device in response to the exhaust gas temperature upstream of the lean-$NO_x$-trap being greater than the threshold and the exhaust gas temperature between the lean-$NO_x$-trap and the selective-catalytic-reduction catalyst being less than the threshold, wherein the delay is based on an estimate of when the exhaust gas temperature between the lean-$NO_x$-trap and the selective-catalytic-reduction catalyst will exceed the threshold. A seventh example of the system, optionally including one or more of the first through sixth examples, further includes where the exhaust gas is rich in response to a lean-$NO_x$-trap regeneration request.

An embodiment of a method comprises flowing air to a portion of an exhaust passage between a lean-$NO_x$ trap (LNT) and a selective-catalytic-reduction (SCR) catalyst in response to the LNT being regenerated and an exhaust gas temperature in the portion of the exhaust passage exceeding a limit temperature. A first example of the method further comprises where the limit temperature is greater than 400° C. A second example of the method, optionally including the first example, further comprises where flowing air to the portion of the exhaust passage in response to a lambda value of exhaust gas in the portion of the exhaust passage being lower than a stoichiometric lambda. A third example of the method, optionally including the first and/or second examples, further comprises where the LNT is upstream of the SCR catalyst, and where the lambda value is based on feedback from an exhaust gas sensor arranged upstream of the LNT or in the portion of the exhaust passage. A fourth example of the method, optionally including one or more of the first through third examples, further comprises where flowing air further includes activating an air supply device, the air supply device positioned to flow air directly into the portion of the exhaust passage. A fifth example of the method, optionally including one or more of the first through fourth examples, further comprises where flowing air further includes adjusting an air flow rate in response to a difference between an exhaust gas air/fuel ratio in the portion of the exhaust passage and a stoichiometric air/fuel ratio. A sixth example of the method, optionally including one or more of the first through fifth examples, further comprises where the air flow rate increases as the difference increases.

An embodiment of an exhaust gas arrangement of an engine system comprises a lean $NO_x$ trap (LNT) arranged upstream of a selective catalytic reduction (SCR) catalyst in an exhaust passage with respect to a direction of exhaust gas flow, an air flow device arranged between the LNT and the SCR catalyst positioned to inject air directly into the exhaust passage, a first sensor arranged between the LNT and SCR catalyst and a second sensor arranged upstream of the LNT, each of the first sensor and the second sensor are configured to sense an exhaust gas composition, a temperature sensor arranged between the LNT and the SCR catalyst configured to sense a temperature of exhaust gas, and a controller with computer-readable instructions stored on non-transitory memory thereof that when executed enable the controller to activate the air flow device in response to a lambda value received from the first sensor indicating an air/fuel ratio of exhaust gas is less than a stoichiometric air/fuel ratio and the temperature sensor indicating the temperature of exhaust gas is greater than or equal to a limit temperature. A first example of the exhaust gas arrangement further comprises where the instructions further enable the controller to delay an activation of the air flow device in response to a lambda value received from the second sensor indicating an air/fuel ratio of exhaust gas is less than the stoichiometric air/fuel ratio and a lambda value received from the first sensor indicating an air/fuel ratio of exhaust gas is greater than or equal to the stoichiometric air/fuel ratio when the temperature of exhaust gas is greater than or equal to the limit temperature. A second example of the exhaust gas arrangement, optionally including the first example, further comprises where the delay is based on a time elapsed until the lambda value from the first sensor indicates the air/fuel ratio is less than the stoichiometric air/fuel ratio. A third example of the exhaust gas arrangement, optionally including the first and/or second examples, further includes where the instructions further enable the controller to delay an activation of the air flow device when the lambda values provided by the first and second sensors indicate the air/fuel ratio is less than the stoichiometric air/fuel ratio in response to the temperature of exhaust gas being less than the limit temperature, wherein the delay is based on a time elapsed until the temperature of exhaust gas exceeds the limit temperature. A fourth example of the exhaust gas arrangement, optionally including one or more of the first through third examples, further includes where the instructions further enable the controller to adjust an air flow rate from the air flow device based on a difference between the air/fuel ratio of exhaust gas and the stoichiometric air/fuel ratio, wherein the air flow rate is increased as the difference increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a lean-$NO_x$-trap arranged upstream of a selective-catalytic-reduction catalyst in an exhaust passage;
an air supply device arranged between the lean-$NO_x$-trap and the selective-catalytic-reduction catalyst; and
a controller with computer-readable instructions stored on non-transitory memory thereof that when executed enable the controller to:
adjust an air flow from the air supply device when an exhaust gas is rich and an exhaust gas temperature is greater than a threshold.

2. The system of claim 1, wherein the air supply device is shaped to admit air into the exhaust passage upstream of the selective-catalytic-reduction catalyst and the lean-$NO_x$-trap, and where the air flow is increased as a difference between a lambda value of the exhaust gas and a stoichiometric lambda increases.

3. The system of claim 2, wherein the lambda value is sensed by an exhaust gas sensor arranged upstream of the selective-catalytic-reduction catalyst and downstream of the lean-$NO_x$-trap.

4. The system of claim 2, wherein the lambda value is sensed by an exhaust gas sensor arranged upstream of the lean-$NO_x$-trap.

5. The system of claim 1, wherein the instructions further enable the controller to delay the air flow from the air supply device in response to the exhaust gas being rich upstream of the lean-NOR-trap and the exhaust gas being stoichiometric or lean between the lean-$NO_x$-trap and the selective-catalytic-reduction catalyst, wherein the delay is based on an estimate of when the exhaust gas between the lean-$NO_x$-trap and the selective-catalytic-reduction catalyst will be rich.

6. The system of claim 1, wherein the instructions further enable the controller to decrease the air flow from the air supply device in response to the exhaust gas being rich and the exhaust gas temperature being less than the threshold.

7. The system of claim 1, wherein the instructions further enable the controller to delay the air flow from the air supply device in response to the exhaust gas temperature upstream of the lean-$NO_x$-trap being greater than the threshold and the exhaust gas temperature between the lean-NOR-trap and the selective-catalytic-reduction catalyst being less than the threshold, wherein the delay is based on an estimate of when the exhaust gas temperature between the lean-$NO_x$-trap and the selective-catalytic-reduction catalyst will exceed the threshold.

8. The system of claim 1, wherein the exhaust gas is rich in response to a lean-$NO_x$-trap regeneration request.

9. A method comprising:
flowing air to a portion of an exhaust passage between a lean-$NO_x$ trap (LNT) and a selective-catalytic-reduction (SCR) catalyst in response to the LNT being regenerated and an exhaust gas temperature in the portion of the exhaust passage exceeding a limit temperature.

10. The method of claim 9, wherein the limit temperature is greater than 400° C.

11. The method of claim 9, further comprising flowing air to the portion of the exhaust passage in response to a lambda value of exhaust gas in the portion of the exhaust passage being lower than a stoichiometric lambda.

12. The method of claim 11, wherein the LNT is upstream of the SCR catalyst, and where the lambda value is based on feedback from an exhaust gas sensor arranged upstream of the LNT or in the portion of the exhaust passage.

13. The method of claim 9, wherein flowing air further includes activating an air supply device, the air supply device positioned to flow air directly into the portion of the exhaust passage.

14. The method of claim 9, wherein flowing air further includes adjusting an air flow rate in response to a difference between an exhaust gas air/fuel ratio in the portion of the exhaust passage and a stoichiometric air/fuel ratio.

15. The method of claim 14, wherein the air flow rate increases as the difference increases.

16. An exhaust gas arrangement of an engine system comprising:
a lean $NO_x$ trap (LNT) arranged upstream of a selective catalytic reduction (SCR) catalyst in an exhaust passage with respect to a direction of exhaust gas flow;
an air flow device arranged between the LNT and the SCR catalyst positioned to inject air directly into the exhaust passage;
a first sensor arranged between the LNT and SCR catalyst and a second sensor arranged upstream of the LNT, each of the first sensor and the second sensor are configured to sense an exhaust gas composition;
a temperature sensor arranged between the LNT and the SCR catalyst configured to sense a temperature of exhaust gas; and
a controller with computer-readable instructions stored on non-transitory memory thereof that when executed enable the controller to:
activate the air flow device in response to a lambda value received from the first sensor indicating an air/fuel ratio of exhaust gas is less than a stoichiometric air/fuel ratio and the temperature sensor indicating the temperature of exhaust gas is greater than or equal to a limit temperature.

17. The exhaust gas arrangement of claim 16, wherein the instructions further enable the controller to delay an activation of the air flow device in response to a lambda value received from the second sensor indicating an air/fuel ratio of exhaust gas is less than the stoichiometric air/fuel ratio and a lambda value received from the first sensor indicating an air/fuel ratio of exhaust gas is greater than or equal to the stoichiometric air/fuel ratio when the temperature of exhaust gas is greater than or equal to the limit temperature.

18. The exhaust gas arrangement of claim 17, wherein the delay is based on a time elapsed until the lambda value from the first sensor indicates the air/fuel ratio is less than the stoichiometric air/fuel ratio.

19. The exhaust gas arrangement of claim 16, wherein the instructions further enable the controller to delay an activation of the air flow device when the lambda values provided by the first and second sensors indicate the air/fuel ratio is less than the stoichiometric air/fuel ratio in response to the temperature of exhaust gas being less than the limit temperature, wherein the delay is based on a time elapsed until the temperature of exhaust gas exceeds the limit temperature.

20. The exhaust gas arrangement of claim 16, wherein the instructions further enable the controller to adjust an air flow rate from the air flow device based on a difference between the air/fuel ratio of exhaust gas and the stoichiometric air/fuel ratio, wherein the air flow rate is increased as the difference increases.

* * * * *